United States Patent
Ishizuka et al.

(10) Patent No.: US 11,878,612 B2
(45) Date of Patent: Jan. 23, 2024

(54) CONVEYANCE SEAT

(71) Applicant: TS TECH CO., LTD., Asaka (JP)

(72) Inventors: Takashi Ishizuka, Tochigi (JP); Atsushi Yamabe, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 0 days.

(21) Appl. No.: 17/613,700

(22) PCT Filed: May 29, 2020

(86) PCT No.: PCT/JP2020/021263
§ 371 (c)(1),
(2) Date: Nov. 23, 2021

(87) PCT Pub. No.: WO2020/241810
PCT Pub. Date: Dec. 3, 2020

(65) Prior Publication Data
US 2022/0227269 A1  Jul. 21, 2022

(30) Foreign Application Priority Data

May 30, 2019  (JP) .................................. 2019-101673
Sep. 17, 2019  (JP) .................................. 2019-168664
Jan. 27, 2020  (JP) .................................. 2020-011097

(51) Int. Cl.
*B60N 2/42*  (2006.01)
*B60N 2/62*  (2006.01)
(Continued)

(52) U.S. Cl.
CPC ................. *B60N 2/42* (2013.01); *B60N 2/62* (2013.01); *A47C 27/056* (2013.01); *B60N 2/4263* (2013.01); *B60N 2/42718* (2013.01)

(58) Field of Classification Search
CPC .... B60N 2/42718; B60N 2/4263; B60N 2/62; B60N 2/42763; B60N 2/42; A47C 27/056
See application file for complete search history.

(56) References Cited

U.S. PATENT DOCUMENTS 4,623,192 A * 11/1986 Koide ..................... B60R 22/26
  297/464
8,398,166 B2 * 3/2013 Lindsay ................. B60N 2/015
  297/284.11
(Continued)

FOREIGN PATENT DOCUMENTS

JP    58-161600 U   10/1983
JP    200-041782 A   2/2000
(Continued)

OTHER PUBLICATIONS

International Search Report and Written Opinion with English Translation issued in PCT/JP2020/021263, dated Jul. 21, 2020 (8 pages).

(Continued)

*Primary Examiner* — Syed A Islam
(74) *Attorney, Agent, or Firm* — Dority & Manning, P.A.

(57) ABSTRACT

Provided is a conveyance seat in which an increase in size is suppressed while an impact to be applied to a seated occupant when an impact such as a collision is generated is properly absorbed. A vehicle seat includes a seat cushion. The seat cushion includes a seat cushion frame including a pair of side frames provided to be separated from each other in a width direction of the vehicle seat, a seat cushion pad placed on the seat cushion frame, and an impact absorbing member provided below the seat cushion pad. The impact absorbing member is disposed between the pair of side frames in the width direction of the vehicle seat. The impact absorbing member is provided with a cavity portion. The impact absorbing member is supported from below by a plate-shaped member.

14 Claims, 31 Drawing Sheets

(51) Int. Cl.
*B60N 2/427* (2006.01)
*A47C 27/05* (2006.01)

(56) References Cited

U.S. PATENT DOCUMENTS

| | | | |
|---|---|---|---|
| 8,991,930 B2* | 3/2015 | Laframboise | B29C 66/742 |
| | | | 297/452.32 |
| 10,889,489 B2* | 1/2021 | Nilson | B68G 7/00 |
| 2019/0299902 A1* | 10/2019 | Nagasawa | B60N 2/002 |
| 2021/0129725 A1 | 5/2021 | Ishizuka et al. | |

FOREIGN PATENT DOCUMENTS

| | | | |
|---|---|---|---|
| JP | 2002-34706 A | | 2/2002 |
| JP | 2002-046513 A | | 2/2002 |
| JP | 2003-291704 A | | 10/2003 |
| JP | 2003-335161 A | | 11/2003 |
| JP | 2003335161 A | * 11/2003 | ........... B60N 2/4263 |

OTHER PUBLICATIONS

Notice of Reasons for Refusal (with English translation) received in corresponding Application No. JP 2020-011097, dated Nov. 29, 2023, 14 pages.

\* cited by examiner

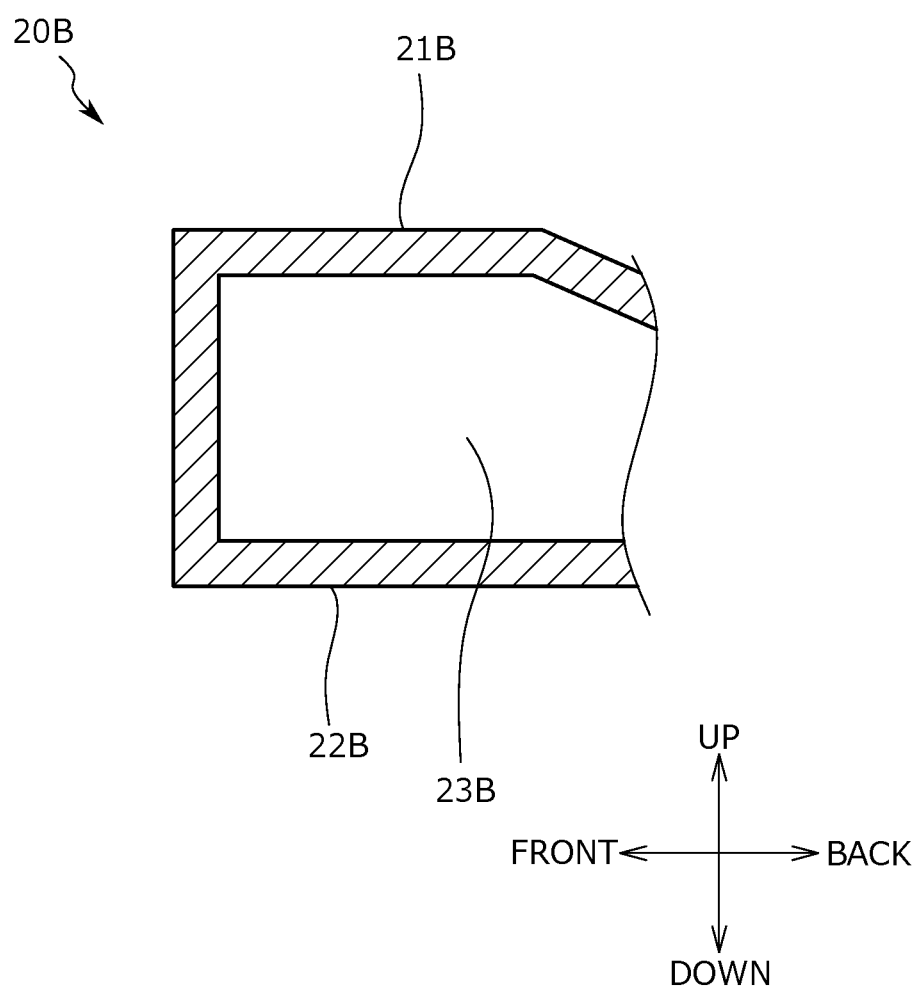

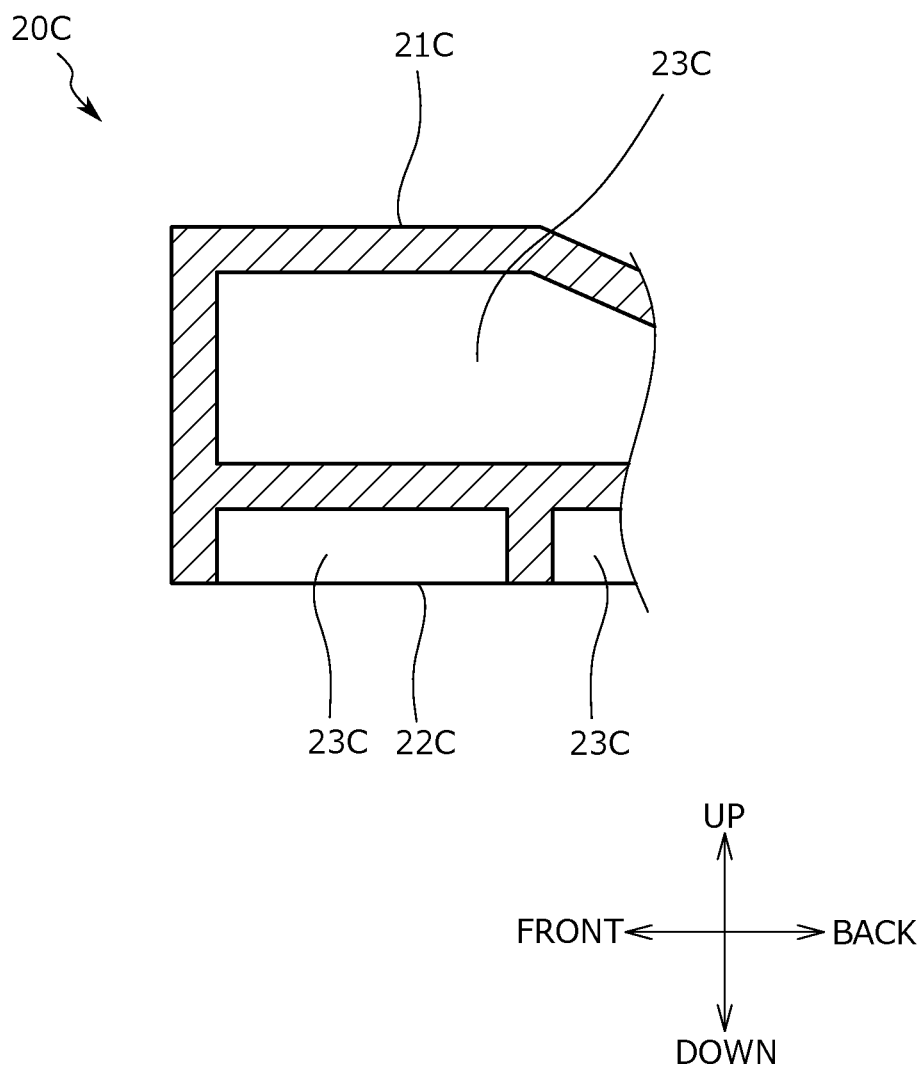

CONVEYANCE SEAT

CROSS REFERENCE TO RELATED APPLICATIONS

This application is the U.S. National Stage entry of International Application No. PCT/JP2020/021263 filed under the Patent Cooperation Treaty and having a filing date of May 29, 2020, which claims priority to Japanese Patent Application No. 2019-101673 having a filing date of May 30, 2019, Japanese Patent Application No. 2019-168664 having a filing date of Sep. 17, 2019, and Japanese Patent Application No. 2020-011097 having a filing date of Jan. 27, 2020, all of which are incorporated herein by reference.

TECHNICAL FIELD

The present invention relates to a conveyance seat, particularly to a conveyance seat capable of absorbing an impact to be applied to a seated occupant when an impact such as a collision is generated.

BACKGROUND ART

When a traveling vehicle undergoes a frontal collision, a submarine phenomenon may occur in which the body of a seated occupant (occupant) seated in a seat slides forward and downward on the surface of the seat in a state where the body of the seated occupant is constrained by a seat belt. As a measure to suppress the submarine phenomenon, for example, as described in PATENT LITERATURE 1, a vehicle seat is known in which a cross member is placed along a lateral width direction of a seat cushion in a middle portion of a frame part of the seat cushion in a front to back direction, and in which a foldable portion can be stretched to suppress a forward movement of an occupant when the buttocks of the occupant tend to move forward during sudden deceleration.

CITATION LIST

Patent Literature

PATENT LITERATURE 1: JP 2002-46513 A

SUMMARY OF INVENTION

Technical Problem

In the vehicle seat described in PATENT LITERATURE 1, since the cross member as an impact absorbing member is placed on a seat cushion frame, specifically, on seat cushion side frames, an increase in the width of the seat cushion frame is required.

The present invention is conceived in light of the above problem, and an object of the present invention is to provide a conveyance seat in which an increase in size is suppressed while an impact to be applied to a seated occupant when an impact such as a collision is generated is properly absorbed.

Solution to Problem

In order to solve the above problem, according to an aspect of the present invention, there is provided a conveyance seat including a seat cushion. The seat cushion includes a seat cushion frame including a pair of side frames provided to be separated from each other in a width direction of the conveyance seat, a seat cushion pad placed on the seat cushion frame, and an impact absorbing member provided below the seat cushion pad. The impact absorbing member is disposed between the pair of side frames in the width direction of the conveyance seat. The impact absorbing member is provided with a cavity portion. The impact absorbing member is supported from below by a support member.

In the seat cushion of the present invention configured as described above, since the impact absorbing member is supported from below by the support member, an impact absorption effect is stably displayed while an increase in size is suppressed.

In addition, in the above configuration, apart of a lower surface of the impact absorbing member may be accommodated in a recessed portion of the support member.

In the above configuration, since a part of the lower surface of the impact absorbing member is accommodated in the recessed portion of the support member, the position of the impact absorbing member is stable.

In addition, in the above configuration, a lower surface of the impact absorbing member may be disposed at a position clear of a bent portion of the support member.

In the above configuration, since the impact absorbing member is disposed at a position clear of the bent portion of the support member, an impact is to be stably absorbed.

In addition, in the above configuration, a part of an upper surface of the impact absorbing member may be accommodated in a pad recessed portion of the seat cushion pad.

In the above configuration, since a part of the upper surface of the impact absorbing member is accommodated in the pad recessed portion of the seat cushion pad, the position of the impact absorbing member is stable.

In addition, in the above configuration, the impact absorbing member may be disposed behind a sinking suppression member extending in the width direction of the conveyance seat.

In the above configuration, when a load during impact absorption is transmitted to the impact absorbing member, an influence of the sinking suppression member such as a submarine pipe is suppressed.

In addition, in the above configuration, a plate-shaped member may be provided at a position facing an upper surface of the impact absorbing member.

In the above configuration, since the plate-shaped member is provided on the upper surface of the impact absorbing member, a load of an occupant is to be stably transmitted to the impact absorbing member.

In addition, in the above configuration, a metal member may not be disposed between an upper surface of the impact absorbing member and the seat cushion pad.

In the above configuration, since a metal member is not disposed between the impact absorbing member and the seat cushion pad above the impact absorbing member, a load of an occupant is to be stably transmitted to the impact absorbing member.

In addition, in the above configuration, the seat cushion pad may be covered with a skin material, and the cavity portion of the impact absorbing member may be disposed at a position clear of a pull-in portion of the skin material.

In the above configuration, when a load during impact absorption is transmitted to the impact absorbing member, an influence of the pull-in portion is suppressed.

In addition, in the above configuration, the seat cushion may include a sensor member, and the cavity portion of the impact absorbing member may be disposed at a position clear of the sensor member.

In the above configuration, when a load during impact absorption is transmitted to the impact absorbing member, an influence of the sensor member is suppressed.

In addition, in the above configuration, the cavity portion of the impact absorbing member may be formed as a recessed portion, and the recessed portion may be provided to extend in a vertical direction.

In the above configuration, since an extending direction of the recessed portion of the impact absorbing member is aligned along a load input direction from an occupant, an impact absorption effect is much more stably displayed.

In addition, in the above configuration, the cavity portion of the impact absorbing member may be formed as a recessed portion, and the recessed portion may have an opening in a lower surface of the impact absorbing member.

In the above configuration, since an opening is formed in the lower surface of the impact absorbing member, a load from an upper surface is to be stably received. Hence, the load is to be stably transmitted to the impact absorbing member.

In addition, in the above configuration, the cavity portion of the impact absorbing member may be formed as a recessed portion, a part of an upper surface of the impact absorbing member may be accommodated in a pad recessed portion of the seat cushion pad, and at least a part of the cavity portion of the impact absorbing member in an up to down direction of the conveyance seat may be disposed at the same height position as a position of the pad recessed portion.

In the above configuration, since the cavity portion of the impact absorbing member is at the same height position (in the same horizontal plane) as the position of the pad recessed portion, a portion of the impact absorbing member surrounded by the pad recessed portion is protected in a horizontal direction.

In addition, in the above configuration, the seat cushion frame may be made of a resin material, and the impact absorbing member may be surrounded by the seat cushion frame in a front to back direction of the conveyance seat and in the width direction of the conveyance seat.

In the above configuration, since the impact absorbing member is surrounded by the seat cushion frame made of resin, the positioning of the impact absorbing member is facilitated.

Advantageous Effects of Invention

According to the conveyance seat of the present invention, since the impact absorbing member is supported from below by the support member, an impact absorption effect is stably displayed while an increase in size is suppressed.

In addition, according to the conveyance seat of the present invention, since a part of the lower surface of the impact absorbing member is accommodated in the recessed portion of the support member, the position of the impact absorbing member is stable.

In addition, according to the conveyance seat of the present invention, since the impact absorbing member is disposed at a position clear of the bent portion of the support member, an impact is to be stably absorbed.

In addition, according to the conveyance seat of the present invention, since a part of the upper surface of the impact absorbing member is accommodated in the pad recessed portion of the seat cushion pad, the position of the impact absorbing member is stable.

In addition, according to the conveyance seat of the present invention, when a load during impact absorption is transmitted to the impact absorbing member, an influence of the sinking suppression member such as a submarine pipe is suppressed.

In addition, according to the conveyance seat of the present invention, since the plate-shaped member is provided on the upper surface of the impact absorbing member, a load of an occupant is to be stably transmitted to the impact absorbing member.

In addition, according to the conveyance seat of the present invention, since a metal member is not disposed between the impact absorbing member and the seat cushion pad above the impact absorbing member, a load of an occupant is to be stably transmitted to the impact absorbing member.

In addition, according to the conveyance seat of the present invention, when a load during impact absorption is transmitted to the impact absorbing member, an influence of the pull-in portion is suppressed.

In addition, according to the conveyance seat of the present invention, when a load during impact absorption is transmitted to the impact absorbing member, an influence of the sensor member is suppressed.

In addition, according to the conveyance seat of the present invention, since the extending direction of the recessed portion of the impact absorbing member is aligned along the load input direction from an occupant, an impact absorption effect is much more stably displayed.

In addition, according to the conveyance seat of the present invention, since an opening is formed in the lower surface of the impact absorbing member, a load from the upper surface is to be stably received. Hence, the load is to be stably transmitted to the impact absorbing member.

In addition, according to the conveyance seat of the present invention, since the cavity portion of the impact absorbing member is at the same height position (in the same horizontal plane) as the position of the pad recessed portion, the portion of the impact absorbing member surrounded by the pad recessed portion is protected in the horizontal direction.

In addition, according to the conveyance seat of the present invention, since the impact absorbing member is surrounded by the seat cushion frame made of resin, the positioning of the impact absorbing member is facilitated.

BRIEF DESCRIPTION OF DRAWINGS

FIG. 8B is a schematic cross-sectional view of the impact absorbing member according to the first modification example.

FIG. 8C is a schematic cross-sectional view of the impact absorbing member according to the first modification example.

DESCRIPTION OF EMBODIMENTS

Hereafter, a conveyance seat according to first and second embodiments of the present invention (hereafter, referred to as the present embodiment) will be described with reference to FIGS. 1 to 21. As an example of the conveyance seat according to the present embodiment, a vehicle rear seat to be mounted in vehicles will be described; however, the conveyance seat is not limited to a vehicle rear seat to be mounted in ground travel conveyances with wheels such as automobiles or railway vehicles, and may be a vehicle front seat, a second row seat of a three-row seat, or a seat to be mounted in aircrafts, ships, etc. that move in regions other than the ground.

Incidentally, the embodiments to be described below are merely one example provided to facilitate understanding of the present invention, and do not limit the present invention. Namely, the shapes, dimensions, dispositions, etc. of members to be described below can be changed or improved without departing from the concept of the present invention, and it goes without saying that the present invention includes equivalents thereof.

Regarding terms indicating directions in the specification, each direction is defined as in FIG. 1. Specifically, in the following description, a "front to back direction" means a front to back direction when viewed from a seated occupant of a vehicle seat, and is a direction aligned with a travel direction of a vehicle. A "seat width direction" means a lateral width direction of the vehicle seat, and is aligned with a right to left direction when viewed from the seated occupant of the vehicle seat. In addition, an "up to down direction" means a height direction of the vehicle seat, and is aligned with an up to down direction of the vehicle seat when viewed from the front.

1. CONFIGURATION OF VEHICLE SEAT S

Figure 1A:
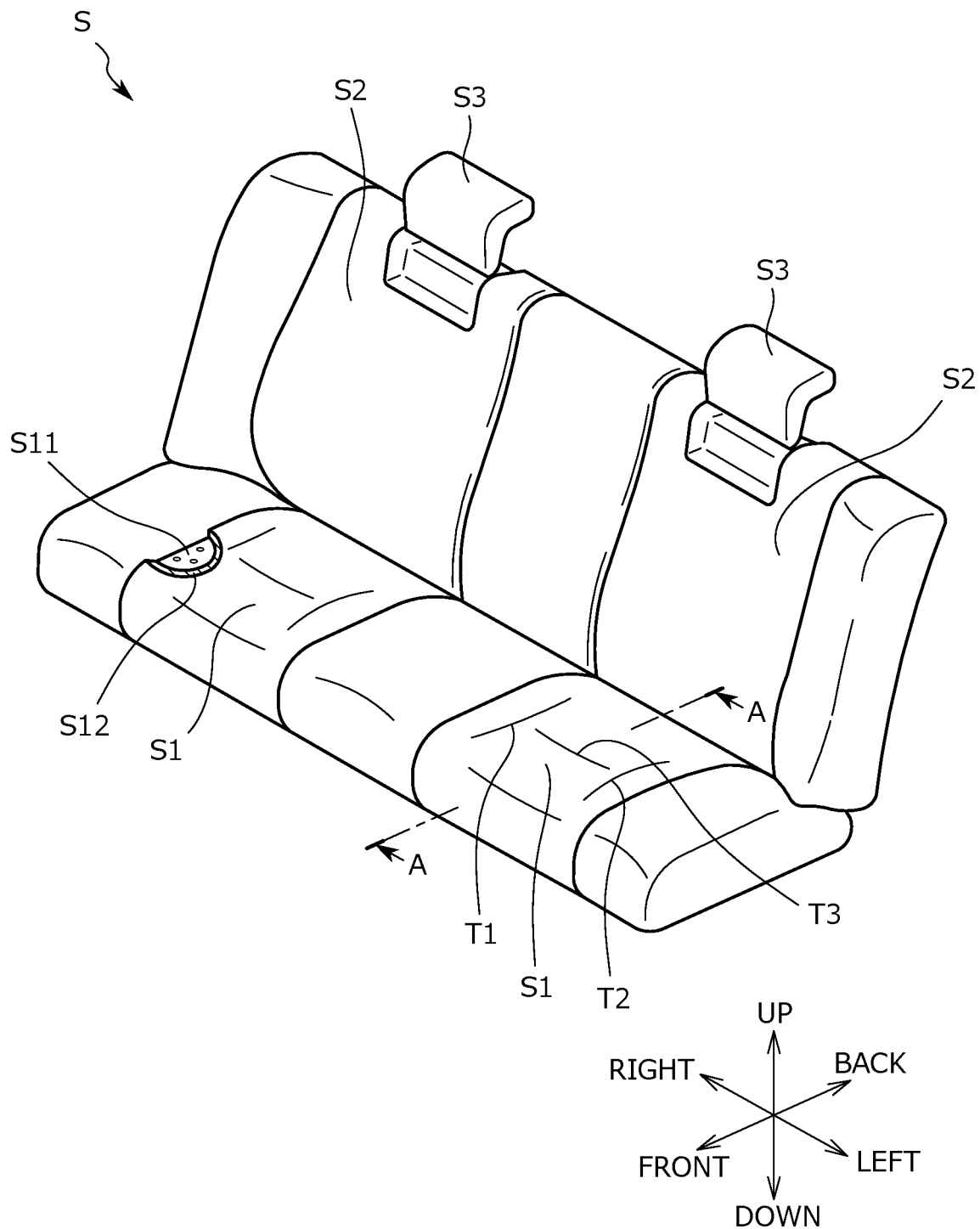
FIG. 1A is an exterior view of a vehicle seat according to first and second embodiments of the present invention.

A vehicle seat S according to the present embodiment has an appearance illustrated in FIG. 1A. Incidentally, in FIG. 1A, for convenience of illustration, a part of the vehicle seat S (specifically, front end corner of a seat cushion S1) is illustrated with a trim cover S12 removed therefrom.

The vehicle seat S includes, as main components, the seat cushion S1 serving as a seating portion that supports the buttocks of a seated occupant, a seat back S2 serving as a backrest portion that supports the back of the seated occupant, and a headrest S3 that is disposed in an upper portion of the seat back S2 to support the head of the seated occupant.

Figure 1B:
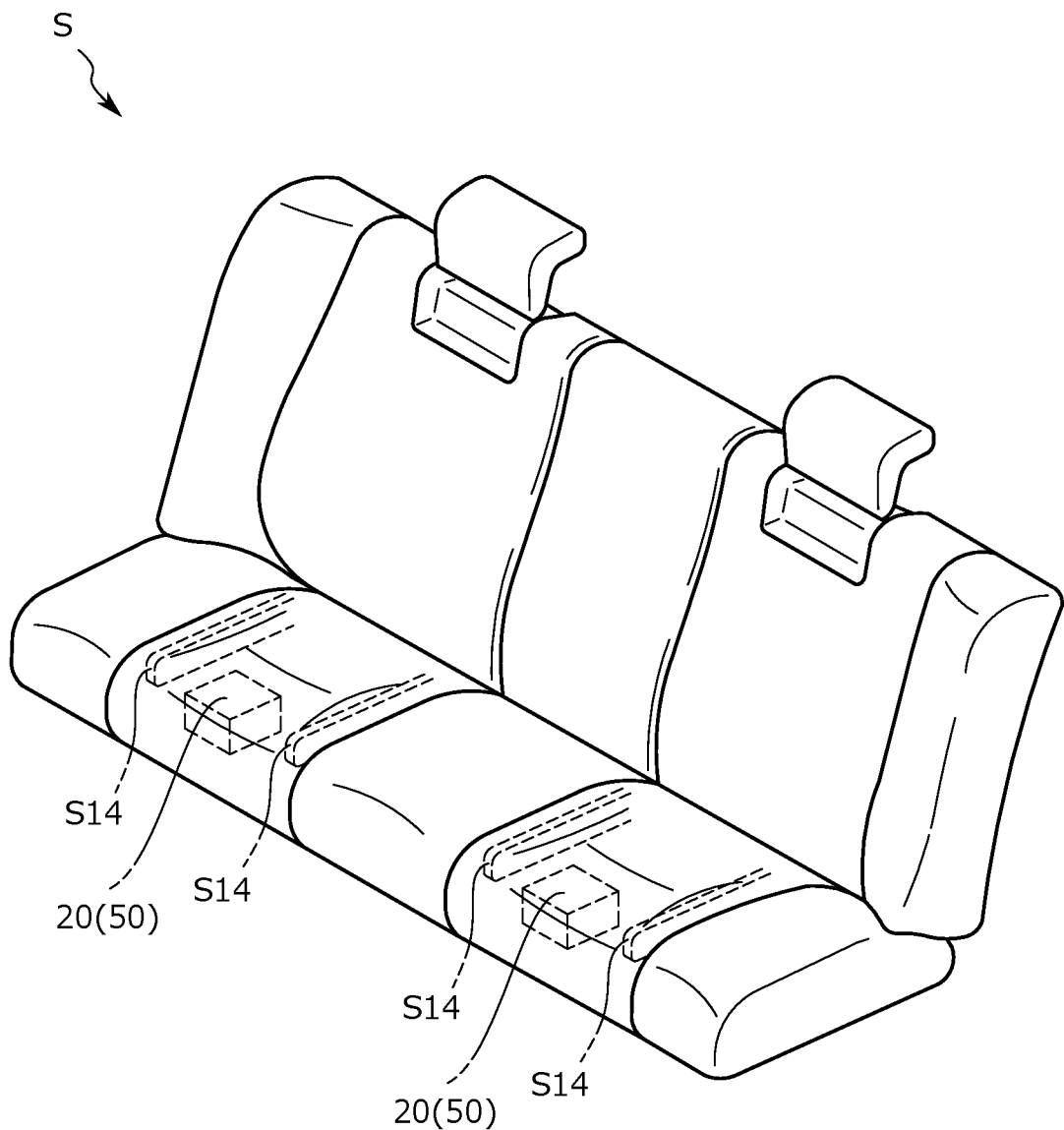
FIG. 1B is an exterior view of the vehicle seat according to the first embodiment of the present invention.

The seat cushion S1 is formed by placing a seat cushion pad S11 on a seat cushion frame that is a skeleton, and covering the seat cushion pad S11 with the trim cover S12. As illustrated in FIG. 1B, the seat cushion frame includes a seat cushion side frame S14. The seat back S2 is formed by placing a cushion pad (not illustrated) on a seat back frame (not illustrated), and covering the cushion pad with the trim cover S12. The headrest S3 is formed by disposing a pad material (not illustrated) on a core (not illustrated), and covering the pad material with the trim cover S12.

The seat cushion pad S11 of the seat cushion S1 or the seat back pad of the seat back S2 is a urethane base material molded by foam molding using a urethane foam material. The trim cover S12 of the seat cushion S1 is provided with a first pull-in portion T1 (right pull-in portion) provided on a right side of the seat cushion to extend in the front to back direction, a second pull-in portion T2 (left pull-in portion) provided on a left side of the seat cushion to extend in the front to back direction, and a third pull-in portion T3 (rear pull-in portion) provided on a rear side of the seat cushion to extend in the seat width direction. In addition, a thin portion formed to have a thinner thickness than those of regions therearound is provided at a position corresponding to each of the pull-in portions T1 to T3 of the seat cushion pad S11.

2. SEAT CUSHION OF FIRST EMBODIMENT

Figure 2:
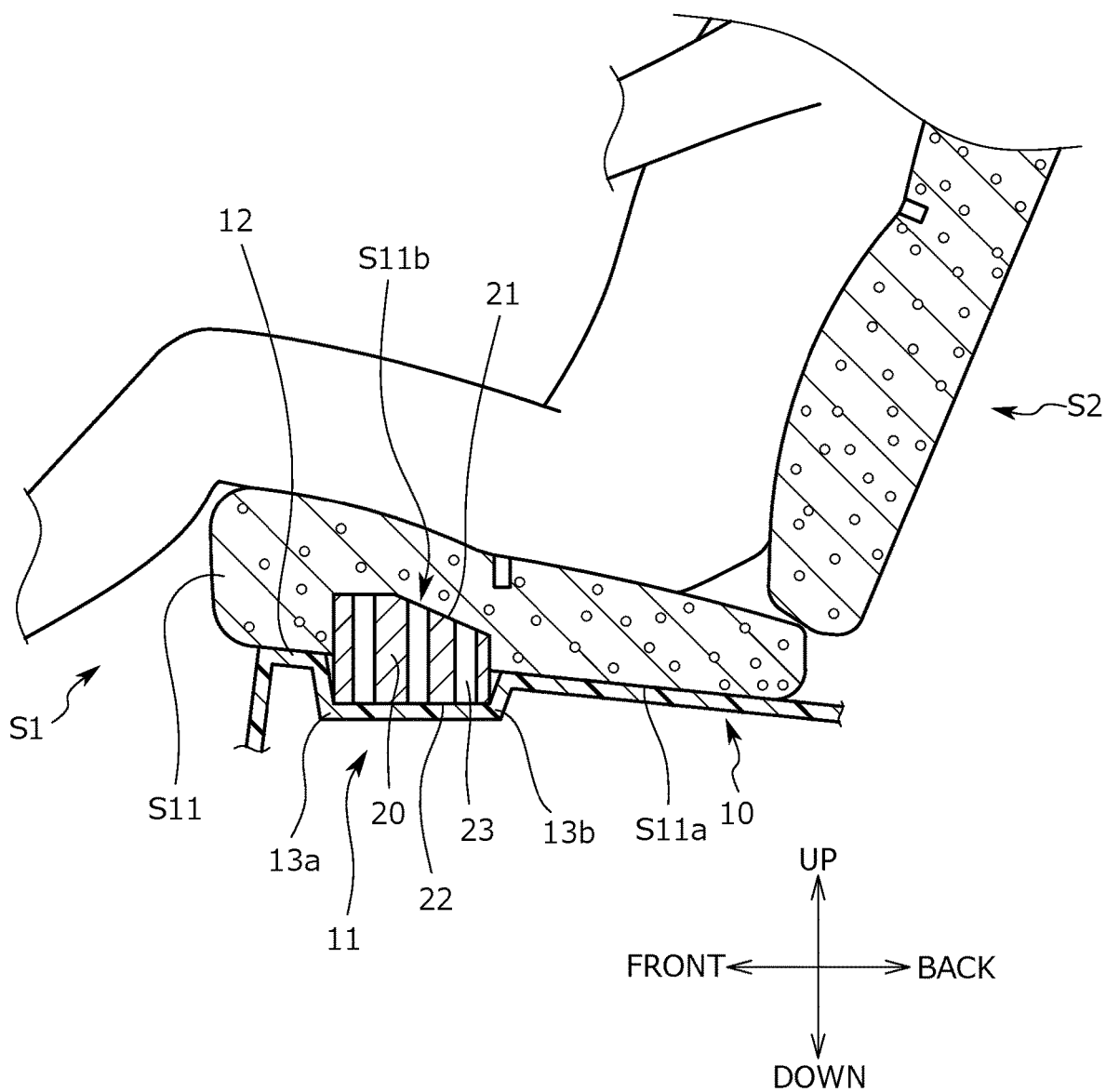
FIG. 2 is a cross-sectional view taken along line A-A in FIG. 1, and describing a structure around an impact absorbing member provided in the vehicle seat according to the first embodiment of the present invention.

A configuration of the seat cushion S1 of the vehicle seat S according to the first embodiment of the present invention will be described with reference to FIGS. 2 to 4B. Incidentally, in FIG. 2, the illustration of the trim cover S12 is omitted. As illustrated in a cross-sectional view of FIG. 2 taken along line A-A in FIG. 1A, an impact absorbing member 20 is provided below the seat cushion pad S11. As illustrated in FIGS. 2 to 3B, a cavity portion 23 is provided, as a through-hole, between an upper surface 21 and a lower surface 22 in the impact absorbing member 20. An inclined surface 21a that is inclined downward as extending backward is formed in the upper surface 21 of the impact absorbing member 20.

The impact absorbing member 20 is disposed inward from a pair of the seat cushion side frames S14 provided to be separated from each other in the seat width direction (FIG. 1B). In more detail, the impact absorbing member 20 is disposed below the seat cushion pad S11 at a substantially center position between the pair of seat cushion side frames S14 in the seat width direction (FIG. 1B). The impact absorbing member 20 is, for example, a urethane molded part, has a higher hardness than that of the seat cushion pad S11 that is a urethane pad, and includes the cavity portion 23 that is to be crushed to absorb an impact when a certain load value is exceeded.

The impact absorbing member 20 is surface supported from below by a plate-shaped member 10 that is a support member. The plate-shaped member 10 is a plate-shaped member forming a floor that supports a vehicle rear seat from below, and a recessed portion 11 that is recessed downward in the vicinity of the thighs of the occupant is formed therein. In addition, a protrusion portion 12 protruding upward with respect to the recessed portion 11 is formed at a front end of the plate-shaped member 10.

Since the lower surface 22 of the impact absorbing member 20 is surface supported from below by the plate-shaped member 10 that is a support member, an impact absorption effect is stably displayed. At this time, since at least a part of the lower surface 22 of the impact absorbing member 20 is accommodate in the recessed portion 11 of the plate-shaped member 10, the position of the impact absorbing member 20 with respect to the plate-shaped member 10 becomes stable.

As illustrated in FIG. 2, the impact absorbing member 20 is disposed between a front bent portion 13a and a rear bent portion 13b in a seat front to back direction. The front bent portion 13a is bent upward to form a front end of the recessed portion 11, and the rear bent portion 13b is bent upward to form a rear end of the recessed portion 11.

As illustrated in FIG. 2, a pad recessed portion S11b that is recessed upward is formed in a lower surface S11a of the seat cushion pad S11. Since at least a part of the upper surface 21 of the impact absorbing member 20 is accommodated in the pad recessed portion S11b of the seat cushion pad S11, the position of the impact absorbing member 20 with respect to the seat cushion pad S11 becomes stable.

The protrusion portion 12 protruding upward extends in the seat width direction, and functions as a sinking suppression member that suppresses a submarine phenomenon in which the body of the seated occupant seated in the vehicle seat S slides forward and downward when the vehicle undergoes a frontal collision. Since the impact absorbing member 20 is disposed behind the protrusion portion 12 extending in the seat width direction, an influence of the protrusion portion 12 is suppressed when a load during impact absorption is transmitted to the impact absorbing member 20. Incidentally, the sinking suppression member may be a pipe member (for example, submarine pipe) extending in the seat width direction in the vicinity of a front end of the seat.

In addition, a metal member such as a seat frame member is not disposed between the upper surface 21 of the impact absorbing member 20 and the lower surface S11a of the seat cushion pad S11. Since a metal member is not disposed between the impact absorbing member 20 and the seat cushion pad S11 above the impact absorbing member 20, a load of the occupant is to be stably transmitted to the impact absorbing member 20.

Figure 3A:
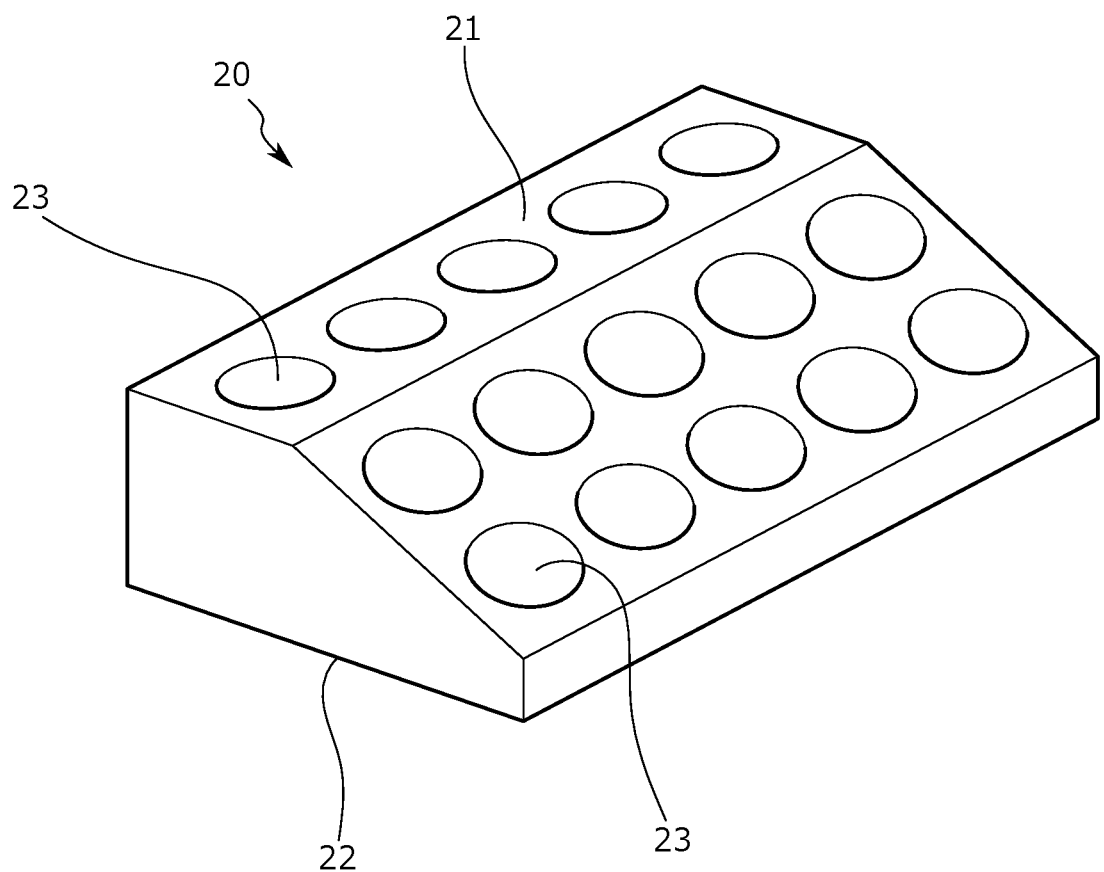
FIG. 3A is an exterior view of the impact absorbing member provided in the vehicle seat according to the first embodiment of the present invention.
Figure 3A:
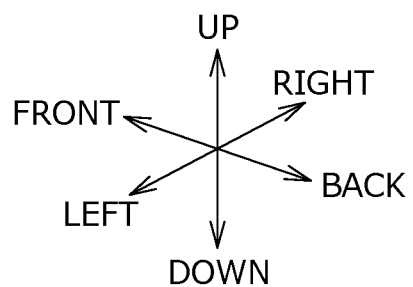
Figure 3B:
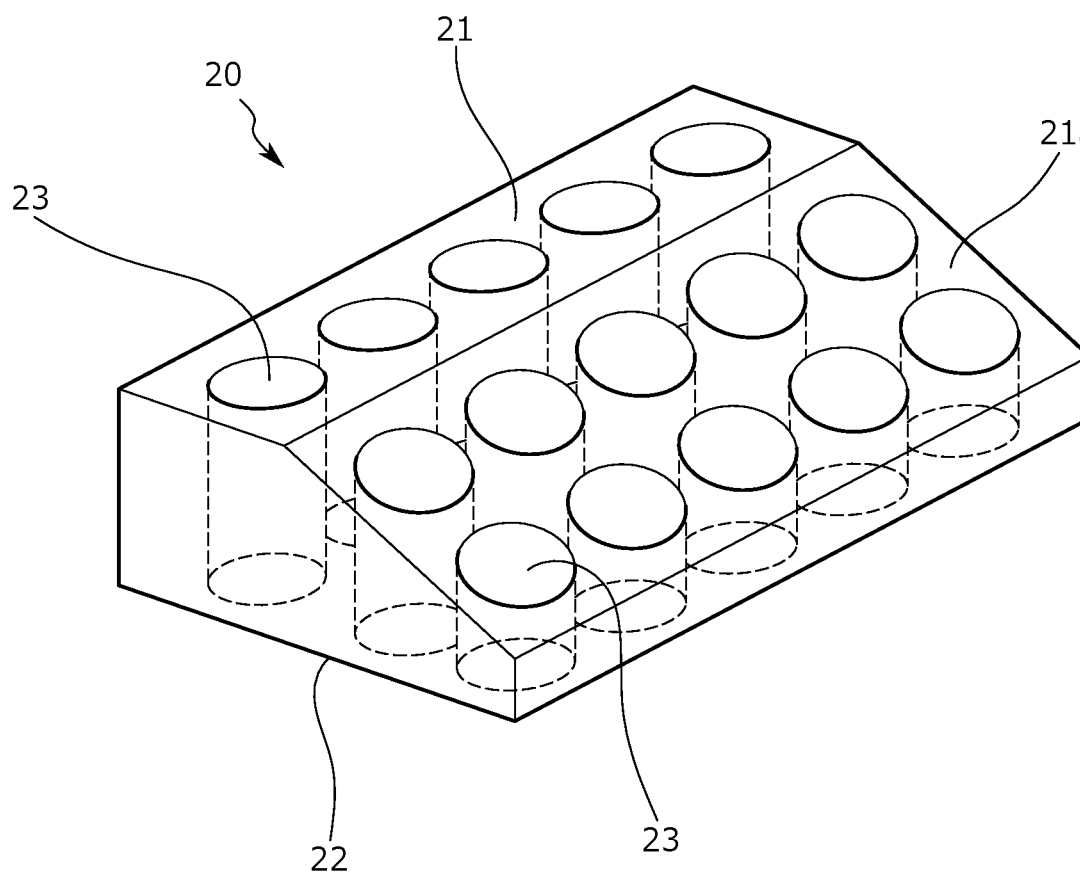
FIG. 3B is a schematic view illustrating an internal structure of the impact absorbing member provided in the vehicle seat according to the first embodiment of the present invention.
Figure 3B:
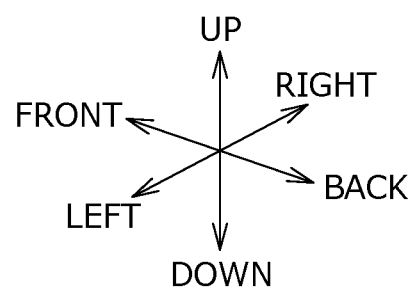

As illustrated in FIGS. 3A and 3B, since the cavity portion 23 of the impact absorbing member 20 is formed as a through-hole (recessed portion penetrating through the impact absorbing member 20 from the upper surface 21 to the lower surface 22) having a circular cylindrical shape, and has no corners, the modability (shape) of the impact absorbing member 20 is stable. Hence, an impact absorption effect becomes more stable.

In this case, in the impact absorbing member 20, the surface area of an opening of the cavity portion 23 in the upper surface 21 may be larger than ⅓ of the total surface area of the upper surface 21, and the surface area of an opening of the cavity portion 23 in the lower surface 22 may be larger than ⅓ of the total surface area of the lower surface 22. As described above, when the cavity portion 23 is formed as a through-hole, and the area of the opening thereof is set larger than ⅓ of the total surface area of the upper surface 21 or the lower surface 22, the setting of an impact absorption load becomes stable.

In addition, since the cavity portion 23 (recessed portion penetrating through the impact absorbing member 20 from the upper surface 21 to the lower surface 22) of the impact absorbing member 20 is provided to extend in a vertical direction, and is aligned along a load input direction (namely, an up to down direction of the vehicle seat S) from the occupant, an impact absorption effect is much more stably displayed.

Figure 3C:
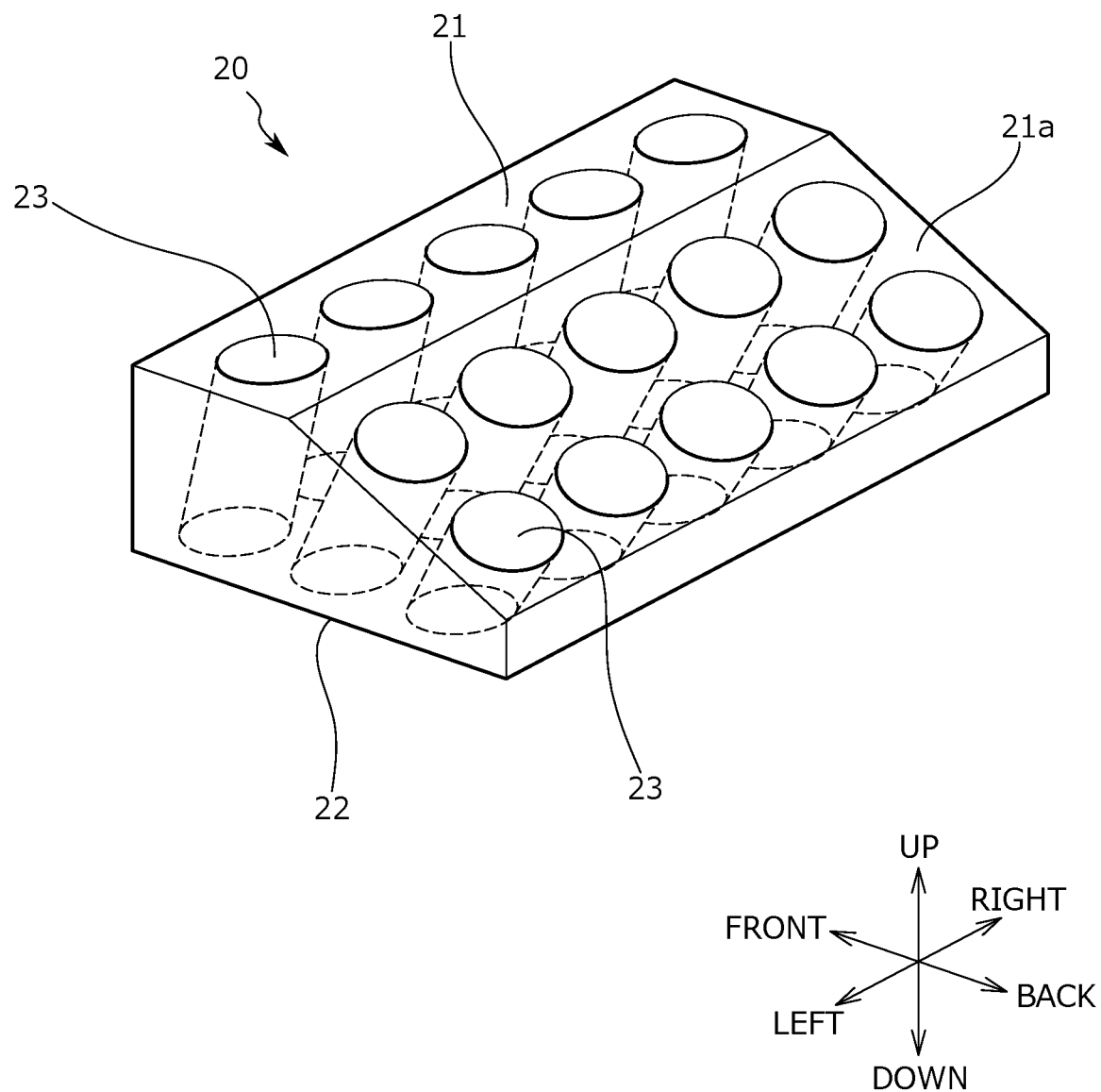
FIG. 3C is a schematic view illustrating the internal structure of the impact absorbing member provided in the vehicle seat according to the first embodiment of the present invention.

Incidentally, as illustrated in FIG. 3C, the cavity portion 23 of the impact absorbing member 20 may be provided to extend in a state where the cavity portion 23 is inclined from the vertical direction and to extend. Specifically, the cavity portion 23 may be inclined from a rear side toward a front side as extending from an upper side toward a lower side. According to such a configuration, the cavity portion 23 is much more aligned with the load input direction from the occupant, so that an impact absorption effect is more stably displayed.

In addition, the cavity portion 23 of the impact absorbing member 20 is a circular cylindrical through-hole. The shape of an end portion of the cavity portion 23 in the upper surface 21 or the lower surface 22 is preferably a circular shape, and may be a perfect circular shape or an elliptical shape.

Figure 4A:
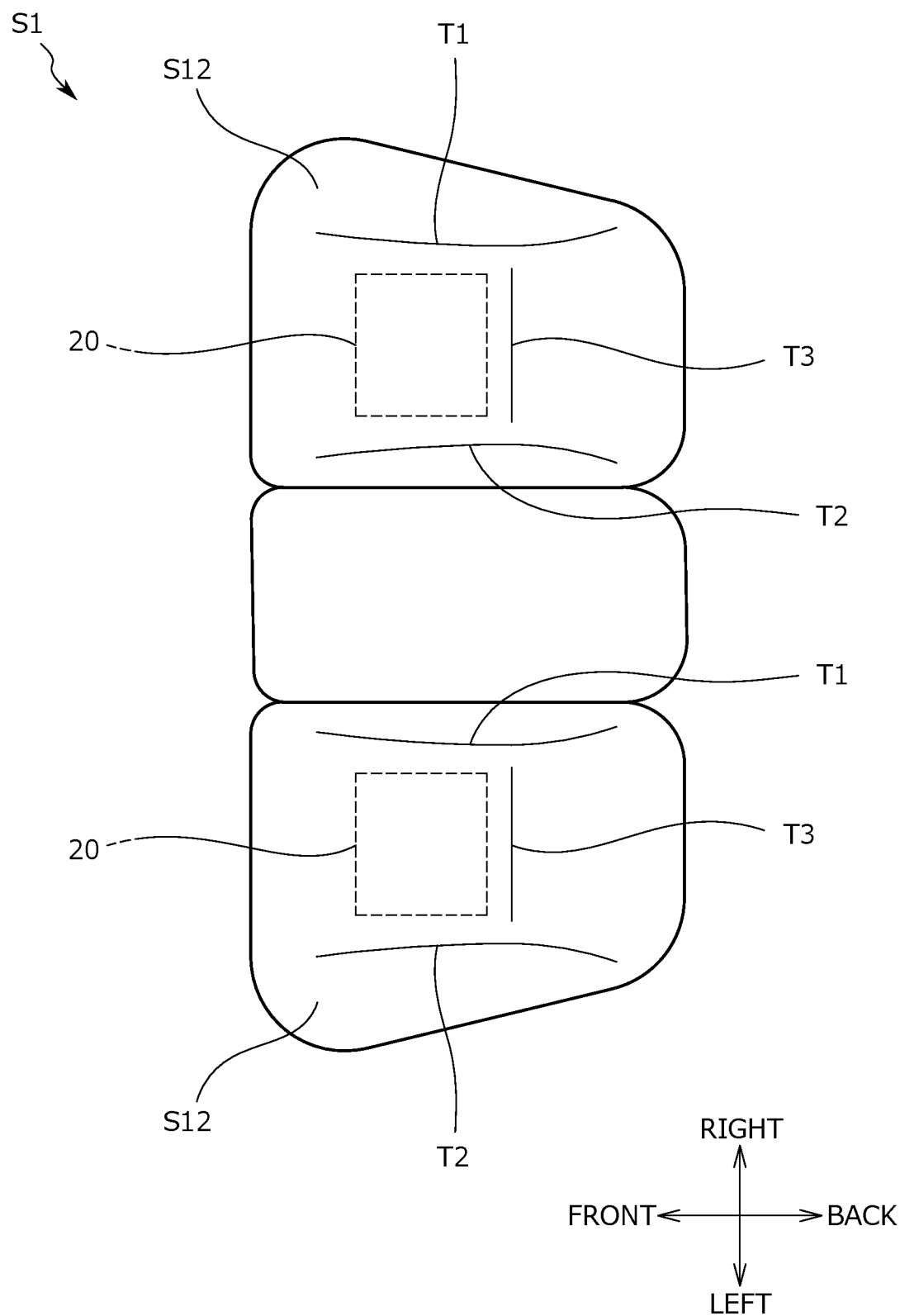
FIG. 4A is a schematic view illustrating a positional relationship between the impact absorbing member and a pull-in portion of a skin material provided in the vehicle seat according to the first embodiment of the present invention.

The seat cushion pad S11 is covered with the trim cover S12 as a skin material, and as illustrated in FIG. 4A, the impact absorbing member 20 and the cavity portion 23 are disposed at a position clear of each of the pull-in portions T1 to T3 of the trim cover S12. Specifically, in a top view of the seat cushion S1, the impact absorbing member 20 and the cavity portion 23 are disposed between the first pull-in portion T1 (right pull-in portion) and the second pull-in portion T2 (left pull-in portion) in the seat width direction, and are disposed in front of the third pull-in portion T3 (rear pull-in portion) in the seat front to back direction. According to such a configuration, when a load during impact absorption is transmitted to the impact absorbing member 20, an influence of each of the pull-in portions T1 to T3 is suppressed.

Figure 4B:
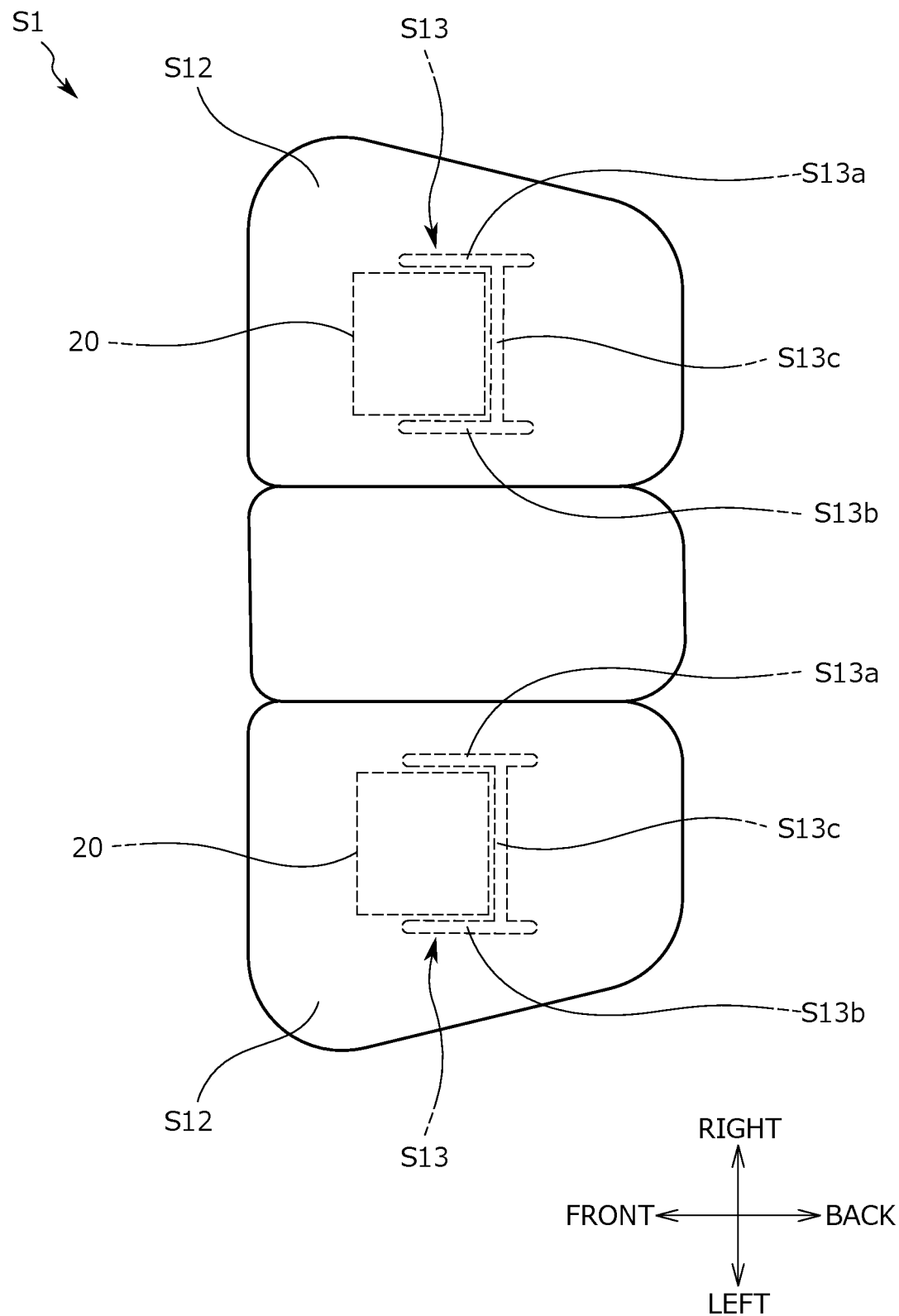
FIG. 4B is a schematic view illustrating a positional relationship between the impact absorbing member and a sensor member provided in the vehicle seat according to the first embodiment of the present invention.

In addition, as illustrated in FIG. 4B, the seat cushion S1 includes a sensor member S13 that detects a state of the seated occupant, and the cavity portion 23 of the impact absorbing member 20 is disposed at a position clear of the sensor member S13. Specifically, in a top view of the seat cushion S1, the impact absorbing member 20 and the cavity portion 23 are disposed between a first sensor portion S13a (right sensor portion) and a second sensor portion S13b (left sensor portion) in the seat width direction, and are disposed in front of a rear portion of a third sensor portion S13c (rear sensor portion) in the seat front to back direction. According to such a configuration, when a load during impact absorption is transmitted to the impact absorbing member 20, an influence of the sensor member S13 (each of the sensor portions S13a to S13c) is suppressed.

3. SEAT CUSHION OF SECOND EMBODIMENT

Figure 5:
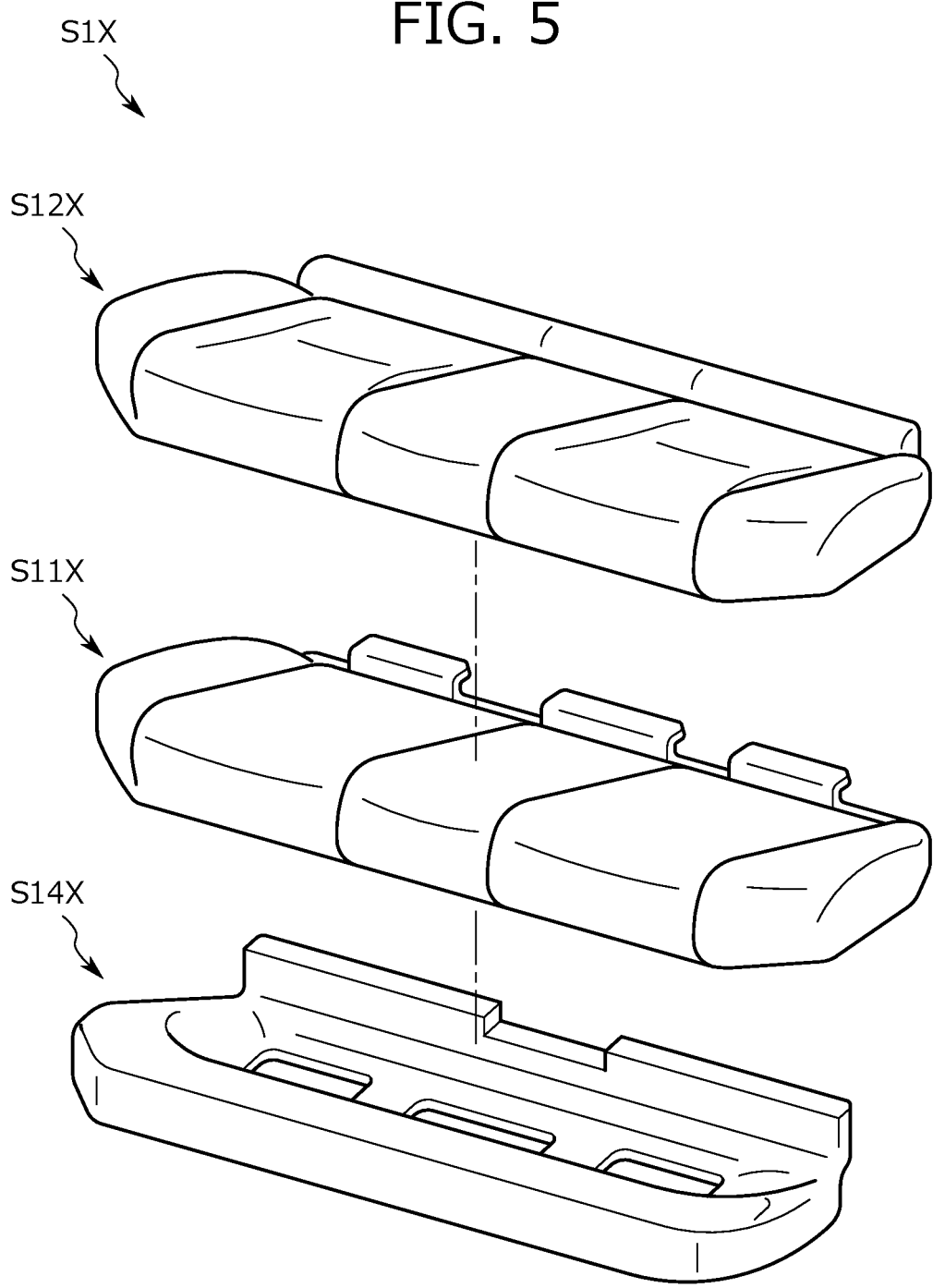
FIG. 5 is an exploded view illustrating a configuration of a seat cushion of the vehicle seat according to the second embodiment of the present invention.
Figure 5:
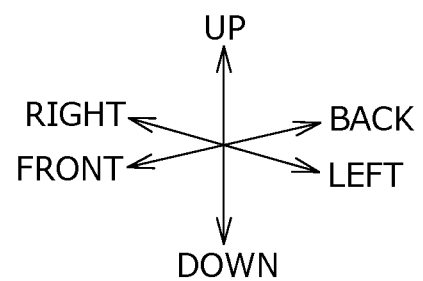

A configuration of a seat cushion S1X of the vehicle seat according to the second embodiment of the present invention will be described with reference to FIGS. 5 to 7B. As illustrated in FIG. 5, the seat cushion S1X is formed by placing a seat cushion pad S11X on a seat cushion frame S14X made of resin that is a skeleton, and covering the seat cushion pad S11X with a trim cover S12X.

Figure 6A:
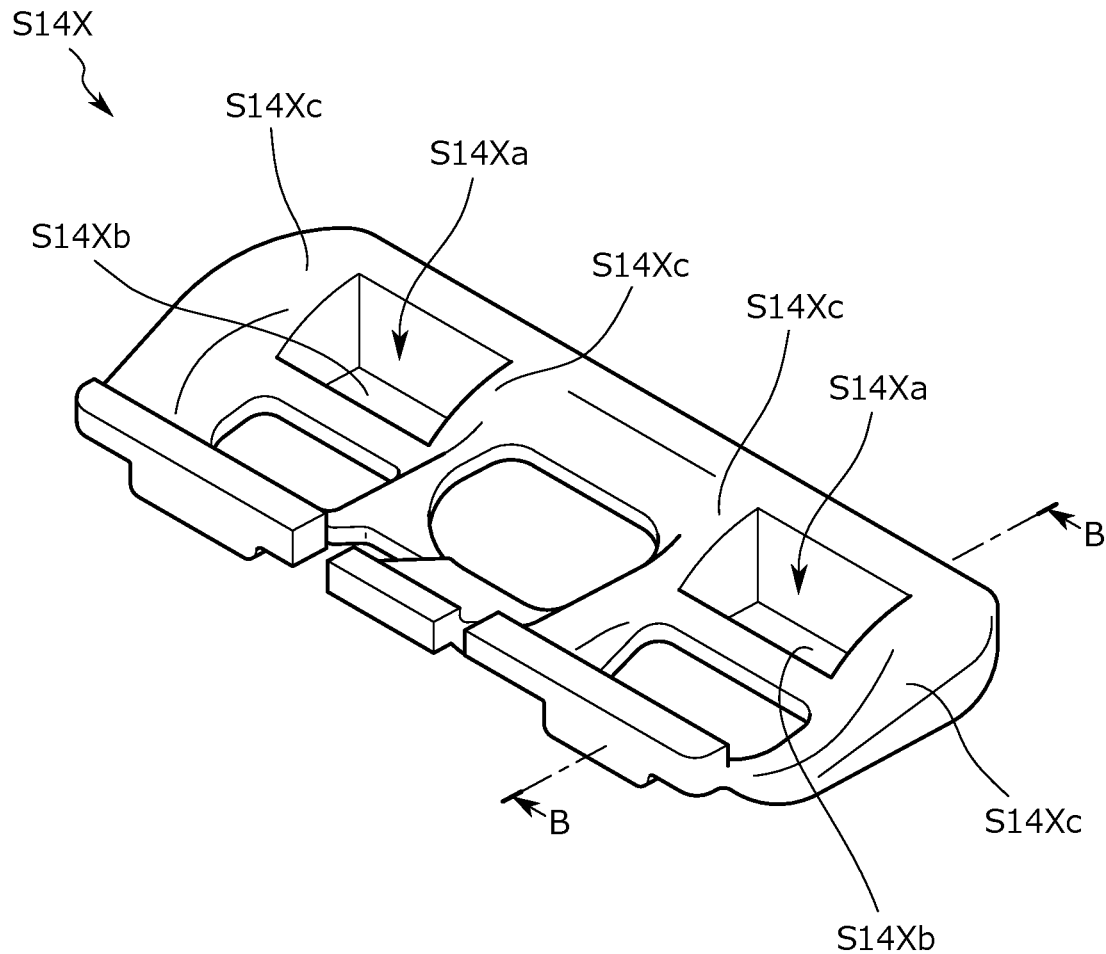
FIG. 6A is an exterior view illustrating a configuration of a seat cushion frame made of resin that is provided in the seat cushion of the vehicle seat according to the second embodiment of the present invention.
Figure 6A:
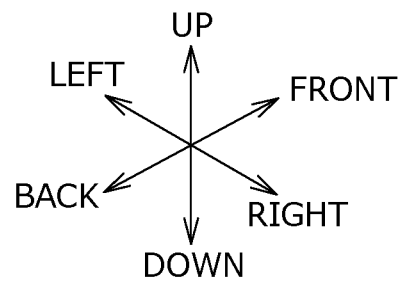
Figure 6B:
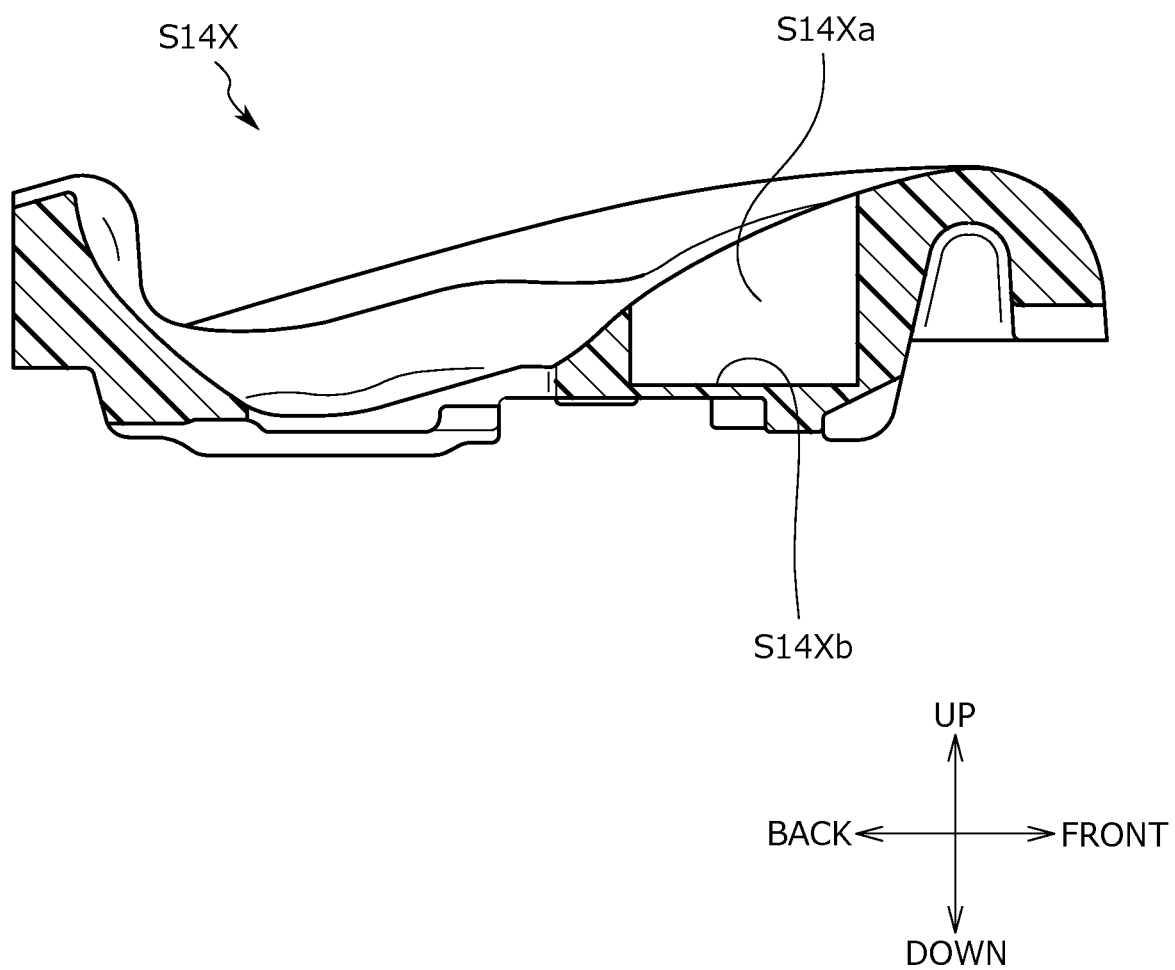
FIG. 6B is a cross-sectional view taken along line B-B in FIG. 6A, and describing the configuration of the seat cushion frame made of resin that is provided in the seat cushion of the vehicle seat according to the second embodiment of the present invention.

As illustrated in FIGS. 6A and 6B, the seat cushion frame S14X includes a recessed portion S14Xa recessed downward. The recessed portion S14Xa is formed such that the height in the up to down direction decreases gradually from the front side as the recessed portion S14Xa extends backward (the depth of the recessed portion decreases gradually).

The recessed portion S14Xa includes a bottom surface S14Xb. As illustrated in FIG. 6A, the recessed portion S14Xa has a width for one occupant, and is disposed between a pair of seat cushion side frames S14Xc provided to be separated from each other in the seat width direction.

Figure 7A:
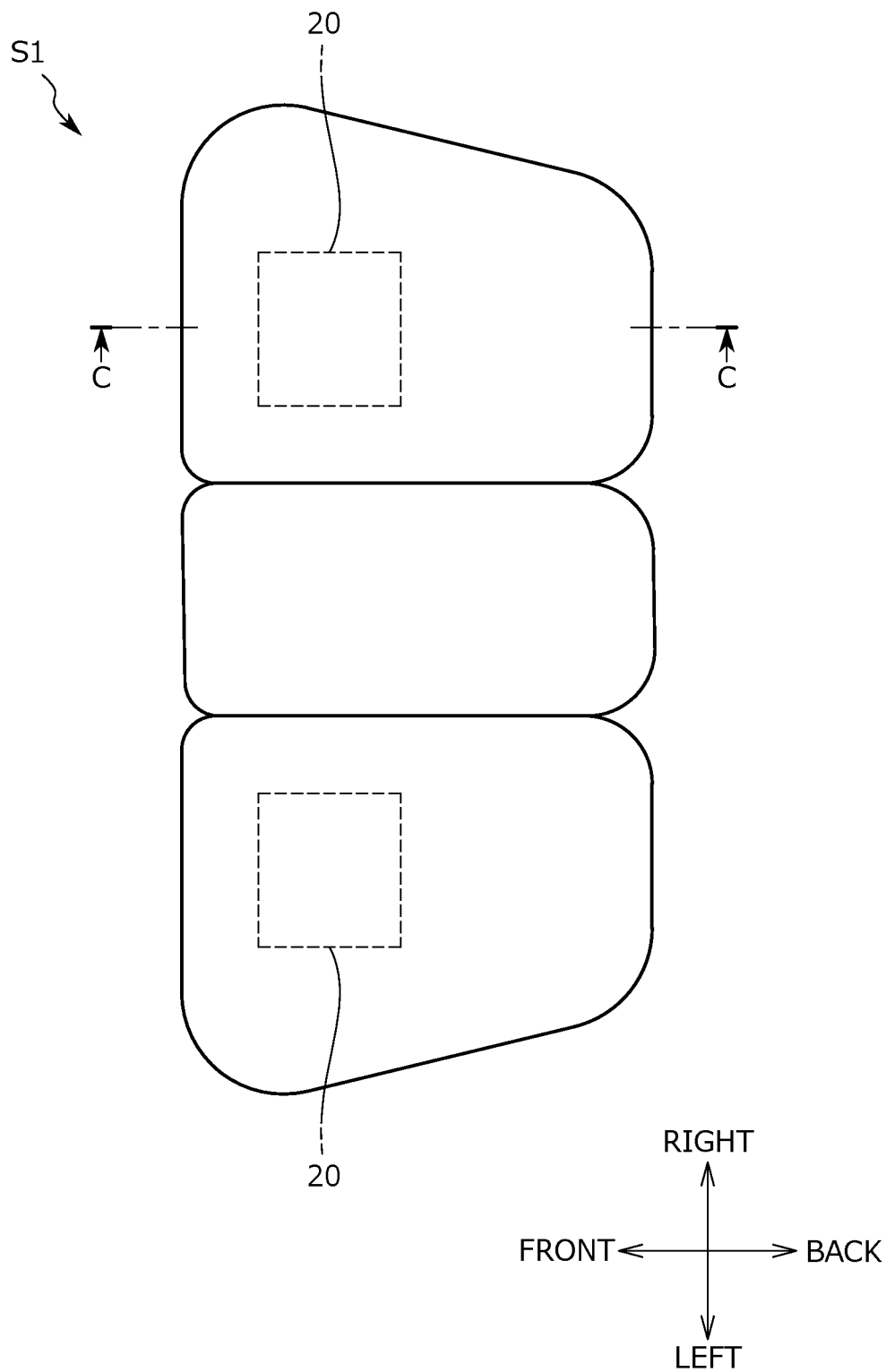
FIG. 7A is a top view of the seat cushion of the vehicle seat according to the second embodiment of the present invention.
Figure 7B:
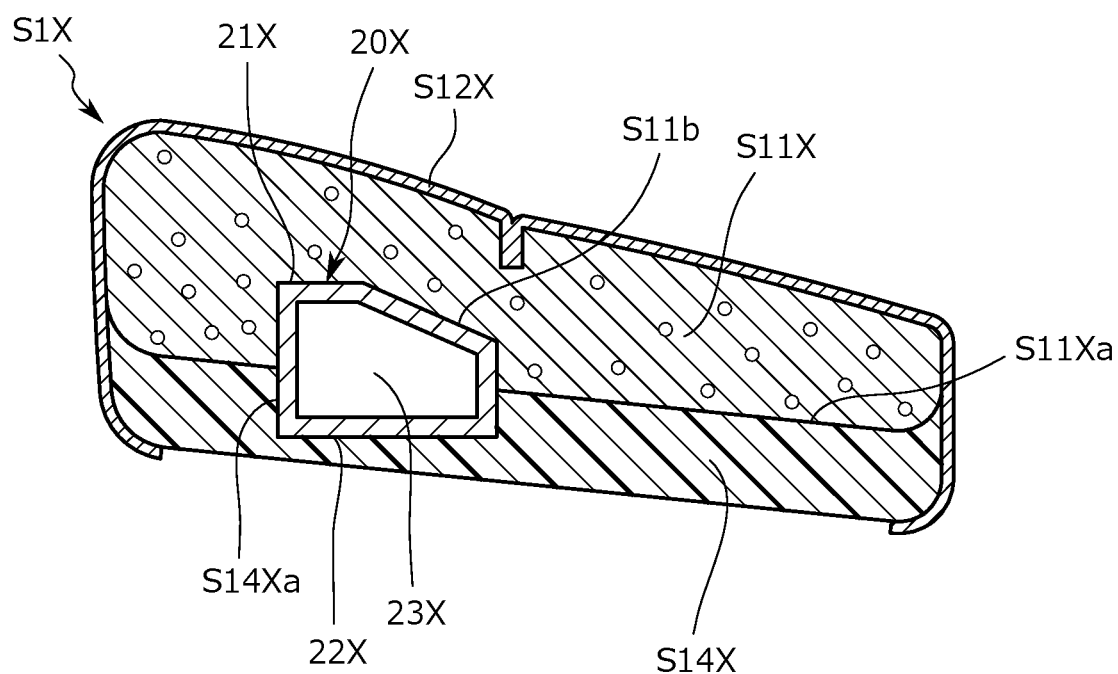
FIG. 7B is a cross-sectional view taken along line C-C in FIG. 7A, and describing the configuration of the seat cushion of the vehicle seat according to the second embodiment of the present invention.
Figure 7B:
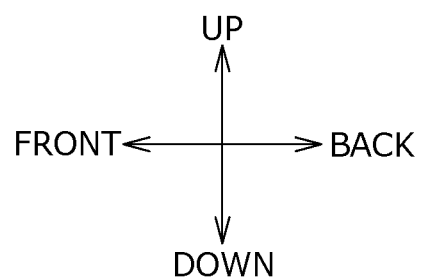

As illustrated in FIGS. 7A and 7B, the recessed portion S14Xa accommodates an impact absorbing member 20X, and a lower surface 22X of the impact absorbing member 20X is surface supported from below by the bottom surface S14Xb. Namely, the seat cushion frame S14X has the role of a support member that surface supports the impact absorbing member from below.

As illustrated in FIGS. 7A and 7B, the impact absorbing member 20X is surrounded by the seat cushion frame S14X in the seat front to back direction and in the seat width direction. Therefore, the positioning of the impact absorbing member 20X in the seat cushion S1X (in other words, the positioning of the impact absorbing member 20X with respect to the seat cushion frame S14X) is facilitated.

In the seat cushion S1X of the vehicle seat according to the second embodiment, the entirety of the seat cushion frame S14X may be fabricated as a blow molded part and the recessed portion S14Xa is provided in a region in which an impact is desired to be absorbed. In addition, the outer shape of the seat cushion frame S14X may be formed from foamed polypropylene (EPP), and the impact absorbing member 20X that is a blow molded part may be disposed in the recessed portion S14Xa. In addition, the outer shape of the seat cushion frame S14X as a blow molded part may be formed, and the impact absorbing member 20X that is a urethane molded part may be disposed in the recessed portion S14Xa.

4. FIRST MODIFICATION EXAMPLE

The present invention is not limited to the above embodiments. Hereinafter, a first modification example of the impact absorbing member and the seat cushion according to the present embodiment will be described with reference to FIGS. 8A to 14.

Figure 8A:
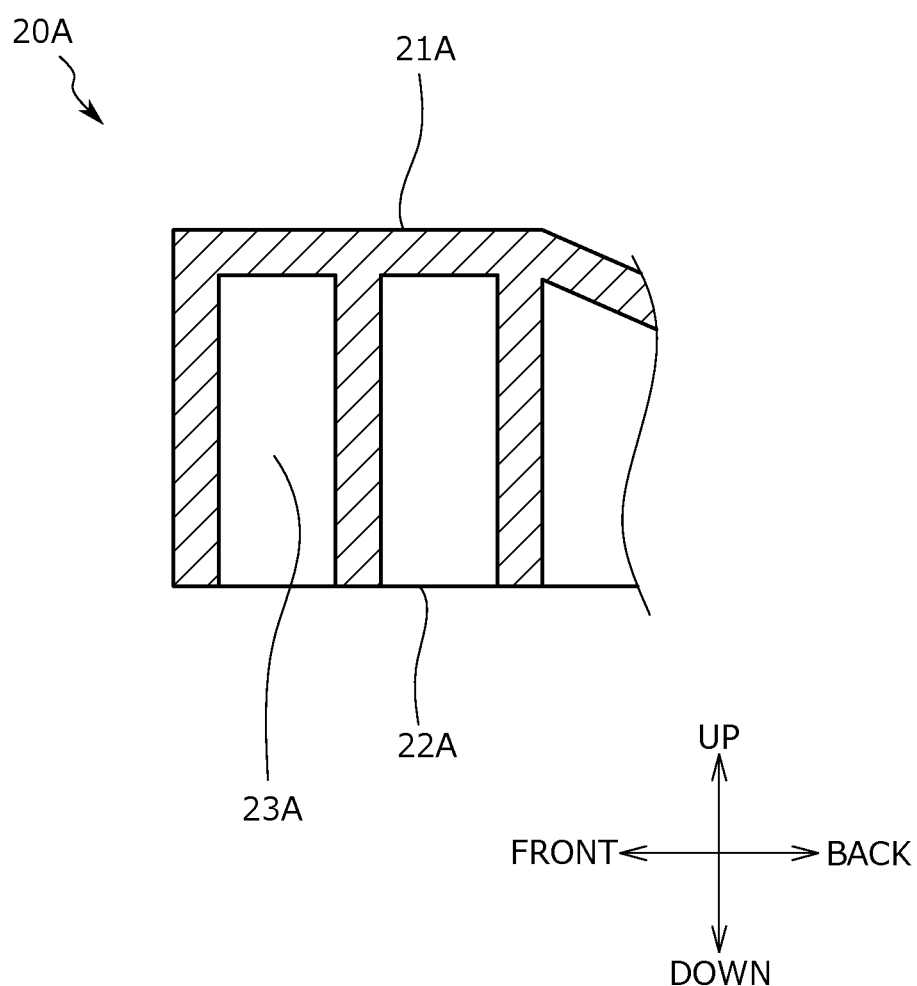
FIG. 8A is a schematic cross-sectional view of an impact absorbing member according to a first modification example.

An impact absorbing member 20A illustrated in FIG. 8A is a urethane molded part, and a cavity portion 23A is formed as recessed portion including a closed surface in a direction of an upper surface 21A. In the impact absorbing member 20A, since an opening of the cavity portion 23A is not provided in the upper surface 21A, and an opening thereof is formed in a lower surface 22A, a load from the upper surface 21A is to be stably received. Hence, the load from the occupant is to be stably transmitted to the impact absorbing member 20A. In addition, since the cavity portion 23A is provided to extend in the vertical direction, and an extending direction of the recessed portion is aligned along the load input direction from the occupant, an impact absorption effect is much more stably displayed.

In addition, contrary to the example illustrated in FIG. 8A, the cavity portion 23A may be formed as a recessed portion including a closed surface in a direction of the lower surface 22A, and in such a case, the lower surface 22A of the impact absorbing member 20 is stably disposed with respect to a support member such as the plate-shaped member 10.

An impact absorbing member 20B and an impact absorbing member 20C illustrated in FIGS. 8B and 8C are blow molded parts made of resin, and the outer shape thereof or the numbers or disposition of recessed portions 23B and 23C can be appropriately set to adjust a load value when the impact absorbing members 20B and 20C are crushed to absorb an impact.

In addition, a plate-shaped member (not illustrated) may be provided at a position facing each of upper surfaces 21A, 21B, and 21C of the impact absorbing members 20A, 20B, and 20C. According to such a configuration, a load of the occupant is to be stably transmitted to each of the impact absorbing members 20A, 20B, and 20C via the plate-shaped member.

Figure 9:
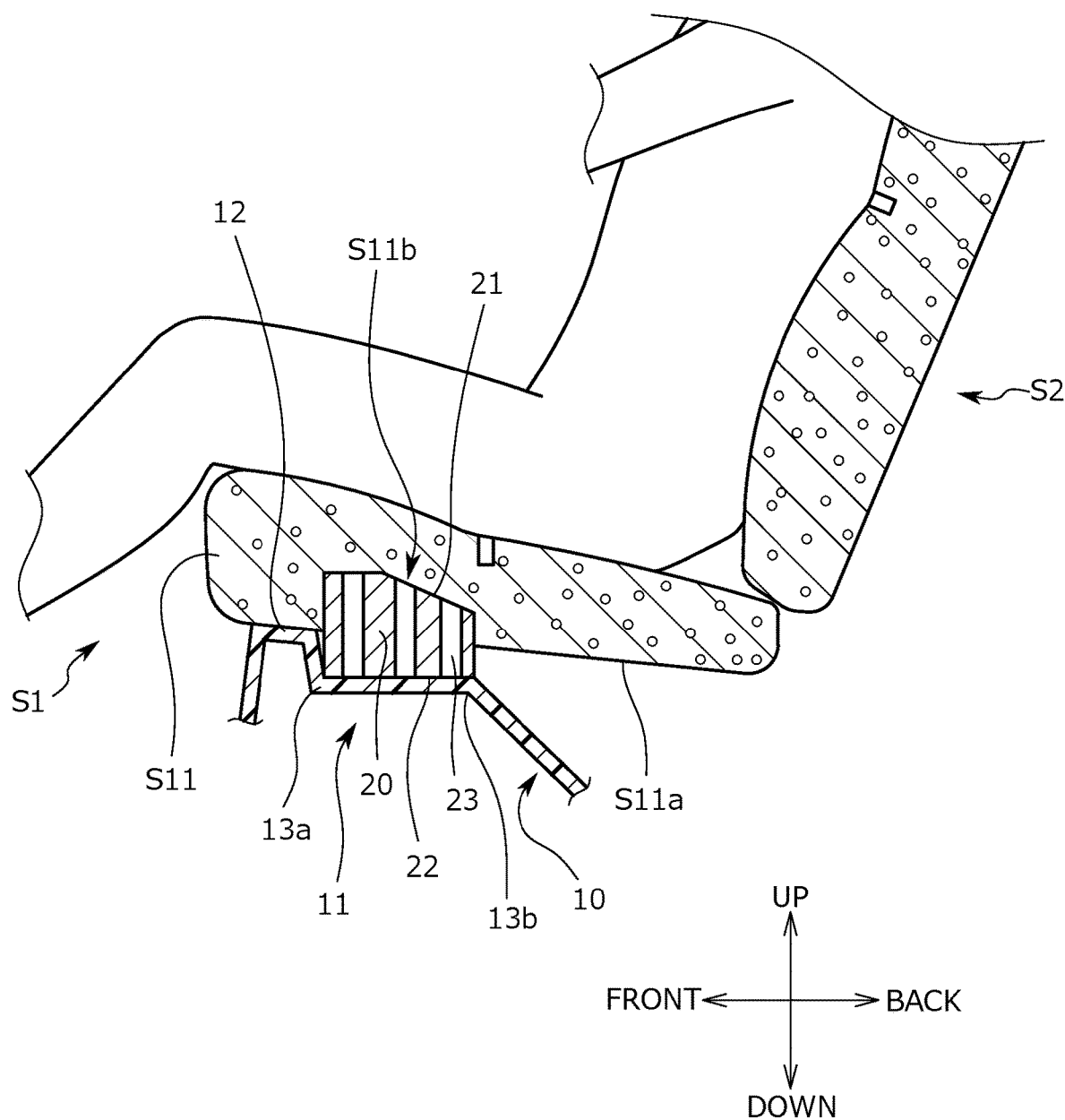
FIG. 9 is a description view illustrating a structure around the impact absorbing member provided in the vehicle seat according to the first modification example of the present invention, and corresponding to a cross-sectional view taken along line A-A in FIG. 1.

In addition, as illustrated in FIG. 9, the plate-shaped member 10 may include the rear bent portion 13b that is bent gradually downward from the front side toward the rear side. In this case, the lower surface 22 of the impact absorbing member 20 may be disposed at a position clear of the bent portions (the front bent portion 13a and the rear bent portion 13b). Specifically, the lower surface 22 of the impact absorbing member 20 may be disposed behind the front bent portion 13a and in front of the rear bent portion 13b in the seat front to back direction. Since the impact absorbing member 20 is disposed at a position clear of the bent portions (the front bent portion 13a and the rear bent portion 13b) of the plate-shaped member 10 as a support member, an impact is to be stably absorbed.

Figure 10:
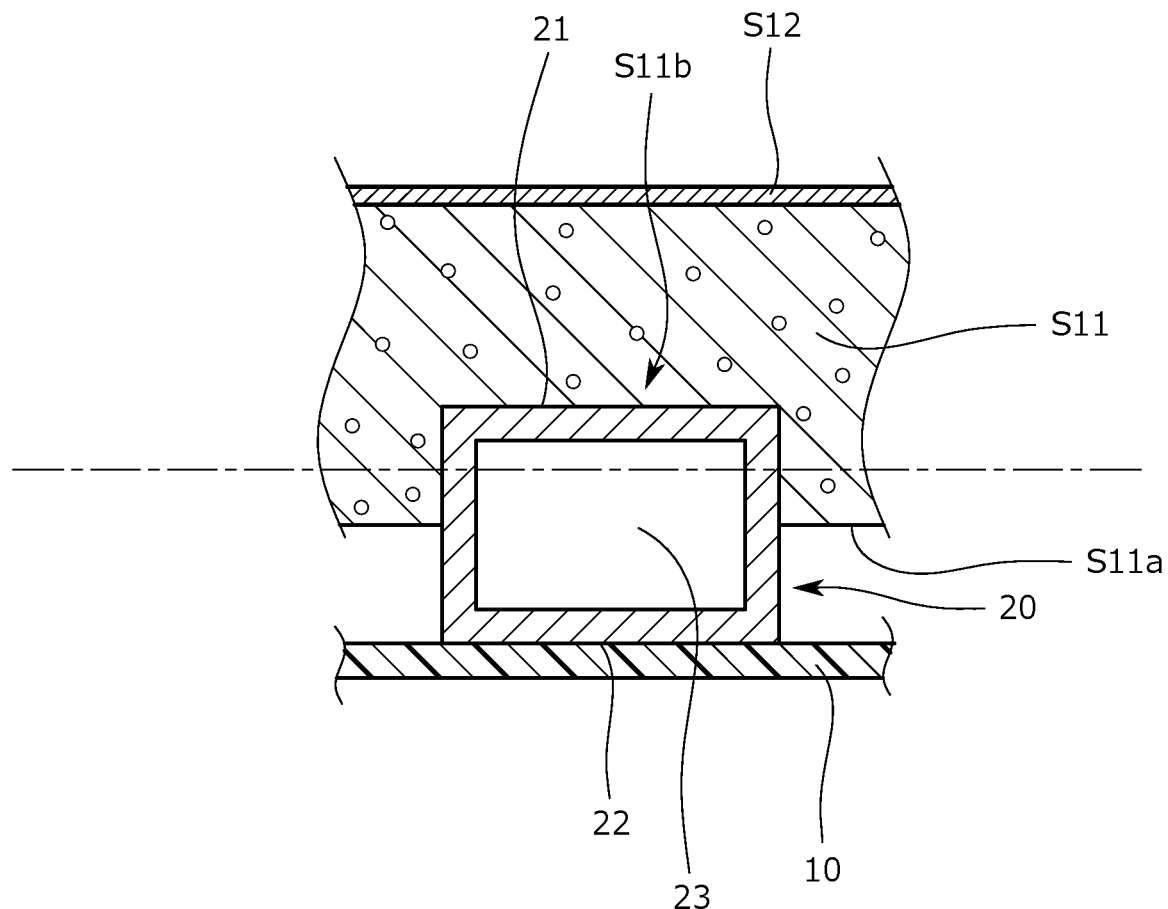
FIG. 10 is a schematic cross-sectional view illustrating a positional relationship between the impact absorbing member and a seat cushion pad according to the first modification example.

In addition, as illustrated in a schematic cross-sectional view of FIG. 10 (vertical cross-sectional view of the seat cushion S1), at least a part of the upper surface 21 of the impact absorbing member 20 may be accommodated in the pad recessed portion S11b of the seat cushion pad S11, and at least a part of the cavity portion 23 of the impact absorbing member 20 in a seat up to down direction may be disposed at the same height position as the position of the pad recessed portion S11b (illustrated by an alternate long and short dash line in FIG. 10). According to such a configuration, a portion of the impact absorbing member 20 surrounded by the pad recessed portion S11b is protected in a horizontal direction.

In addition, the pad recessed portion S11b of the seat cushion pad S11 and the cavity portion 23 of the impact absorbing member 20 are disposed clear of a position at which the pad recessed portion S11b and the cavity portion 23 are in the same plane, in other words, the cavity portion 23 of the impact absorbing member 20 may be disposed at a height position different from that of the pad recessed portion S11b in the seat up to down direction. According to such a configuration, a load can be more stably received inside the pad recessed portion S11b.

In the above embodiments, the case where the support member is the plate-shaped member 10 forming the floor that supports the vehicle rear seat from below, or the case where the support member is the seat cushion frame S14X made of resin has been illustrated as an example; however, the support member may be a pan frame provided in the seat cushion frame.

In addition, in the above embodiments, when the cavity portion of the impact absorbing member is formed as a recessed portion, an inclination angle may be given to form a wide opening in the lower surface. Since the inclination angle is given to form a wide opening in the lower surface, the area of an upper surface which receives a load increases. Hence, the load can be stably received.

In addition, in the above embodiments, when the cavity portion of the impact absorbing member is formed as a recessed portion, an inclination angle may be given to form a wide opening in the upper surface. Since the inclination angle is given to form a wide opening in the upper surface, the lower surface of the impact absorbing member is stably disposed on a support member such as a plate-shaped member.

In addition, in the above embodiments, the cavity portion 23 of the impact absorbing member 20 is formed as a circular cylindrical through-hole (FIGS. 3A and 3B), but the through-hole can also have a square cylindrical shape. When the shape of the through-hole is a square cylindrical shape, the surface area of the opening in the upper surface 21 or the lower surface 22 can be set wider than in the case of a circular cylindrical shape.

In the above embodiments and the modification example, since a urethane molded part or a blow molded part made of resin that is lighter than one made of metal is used as the impact absorbing member, impact absorbability is improved while the weight is reduced.

In the above embodiments and the modification example, the support member is the plate-shaped member 10 or the seat cushion frame S14X; however, the support member is not limited as long as the support member is capable of supporting the impact absorbing member 20 from below. For example, when the support member is the plate-shaped member 10, a pan frame provided in the seat cushion frame, a resin plate as a pressure-receiving member, a wooden plate, etc. can be used as the support member.

Figure 11:
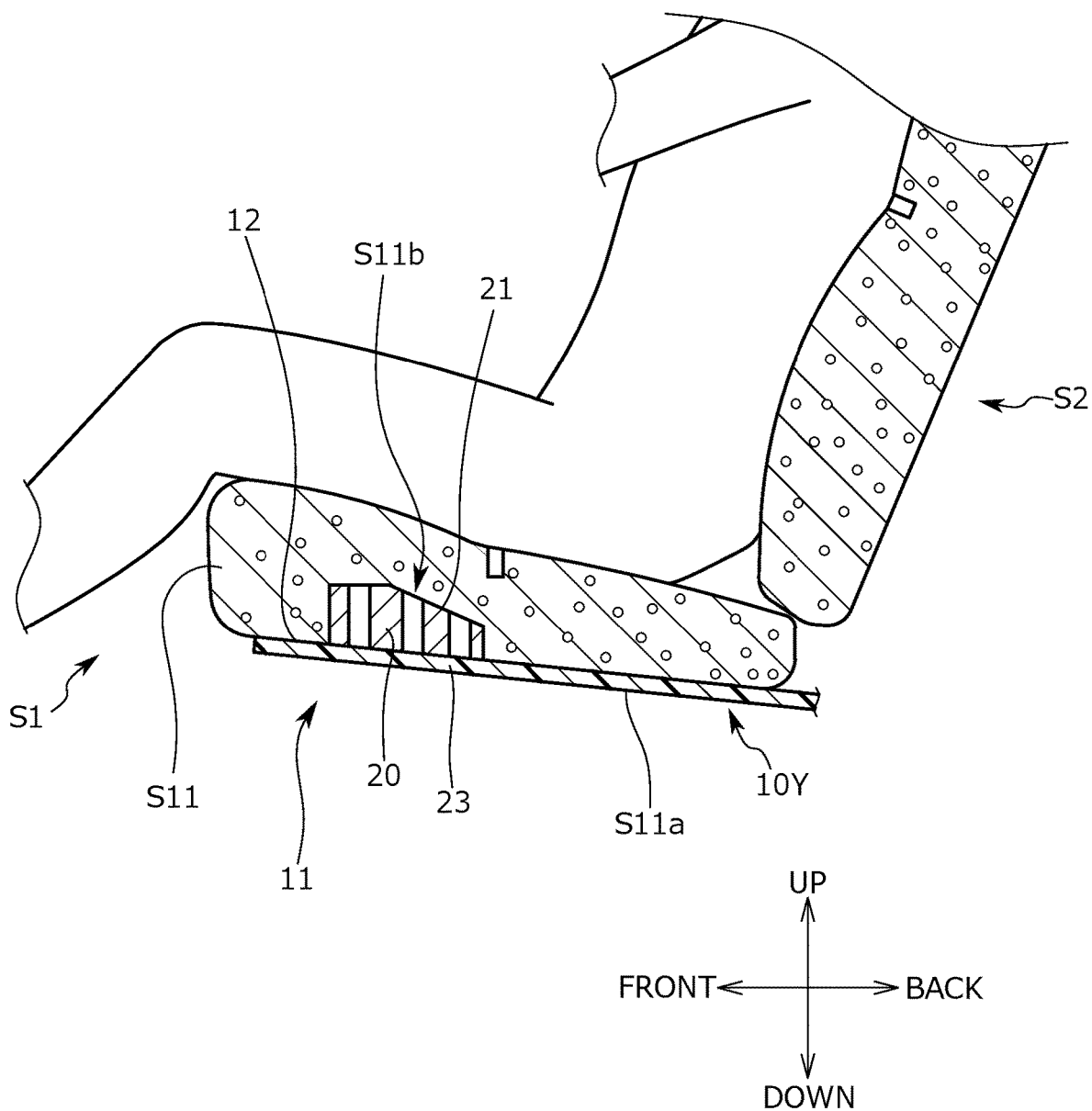
FIG. 11 is a schematic cross-sectional view illustrating the impact absorbing member and a support member according to the first modification example.

In addition, as long as the support member is capable of supporting the impact absorbing member 20 from below, the support member is not limited to a plate-shaped member that surface supports the impact absorbing member 20 from below. For example, as illustrated in FIG. 11, a support member 10Y that supports the impact absorbing member 20 from below may be a pressure-receiving member formed of a linear member such as an S spring or a wire, or may be a cloth-shaped support member.

Figure 12:
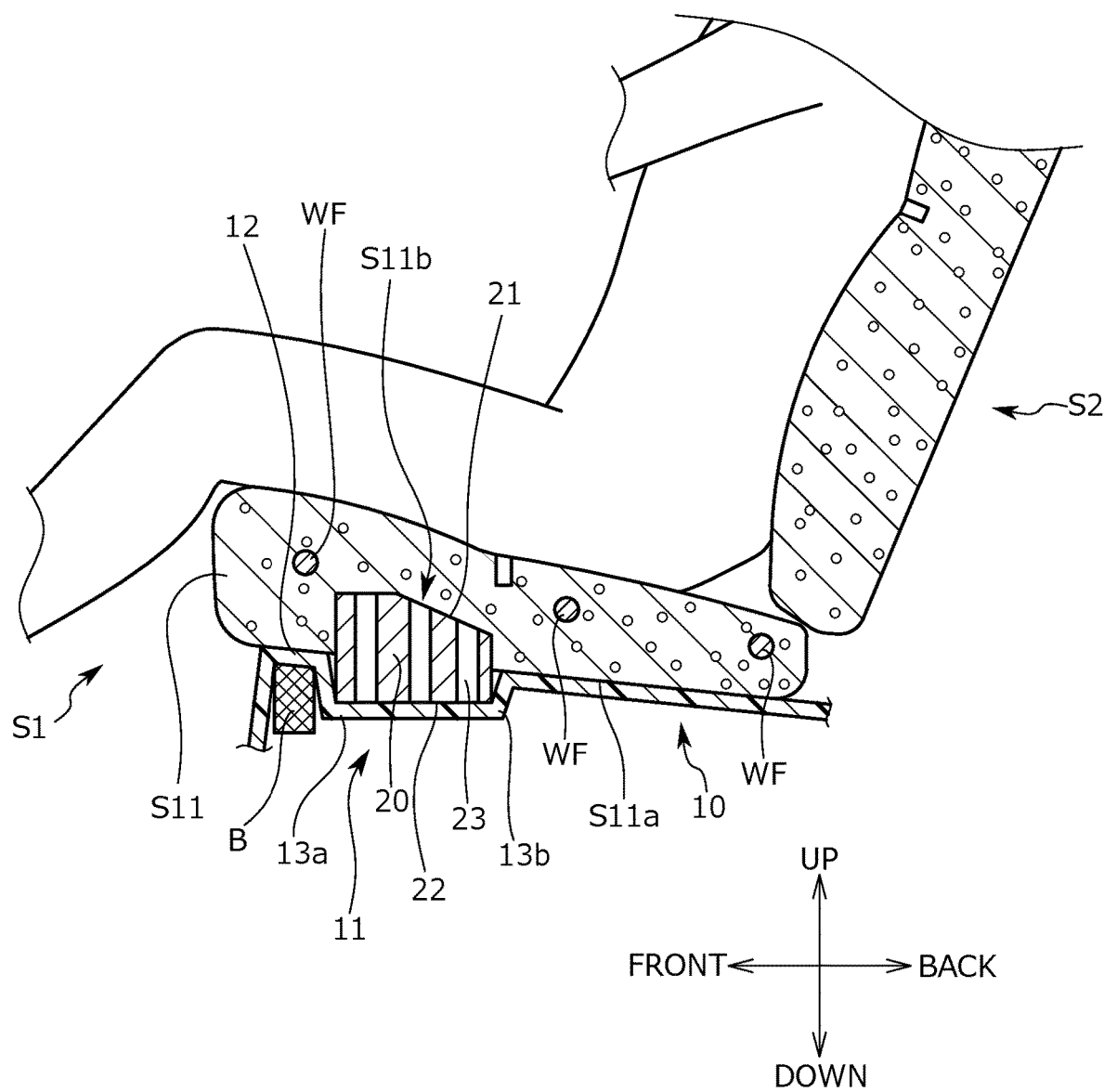
FIG. 12 is a schematic cross-sectional view illustrating a positional relationship between the impact absorbing member and a blower or a wire frame according to the first modification example.

A metal member is not disposed between the upper surface 21 of the impact absorbing member 20 and the seat cushion pad S11. Specifically, as illustrated in FIG. 12, the impact absorbing member 20 is disposed clear of a wire frame WF as a metal member. In detail, the impact absorbing member 20 is disposed at a position different from that of the wire frame WF in the seat front to back direction. Namely, the wire frame WF is not disposed above the impact absorbing member 20.

In addition, as illustrated in FIG. 12, the impact absorbing member 20 may be disposed clear of a position at which the impact absorbing member 20 overlaps a blower B in the seat up to down direction, the blower B being an air blowing device provided below the plate-shaped member 10 (protrusion portion 12 as a pan frame). Specifically, as illustrated in FIG. 12, the impact absorbing member 20 is disposed clear of the blower B. In detail, the impact absorbing member 20 is disposed at a position different from that of the blower B in the seat front to back direction. Namely, the blower B is not disposed above or below the impact absorbing member 20. A space at a location where the blower B is disposed is narrowed in the seat up to down direction (height direction), and according to such a configuration, a space in which the impact absorbing member 20 is disposed can be widened.

Figure 13:
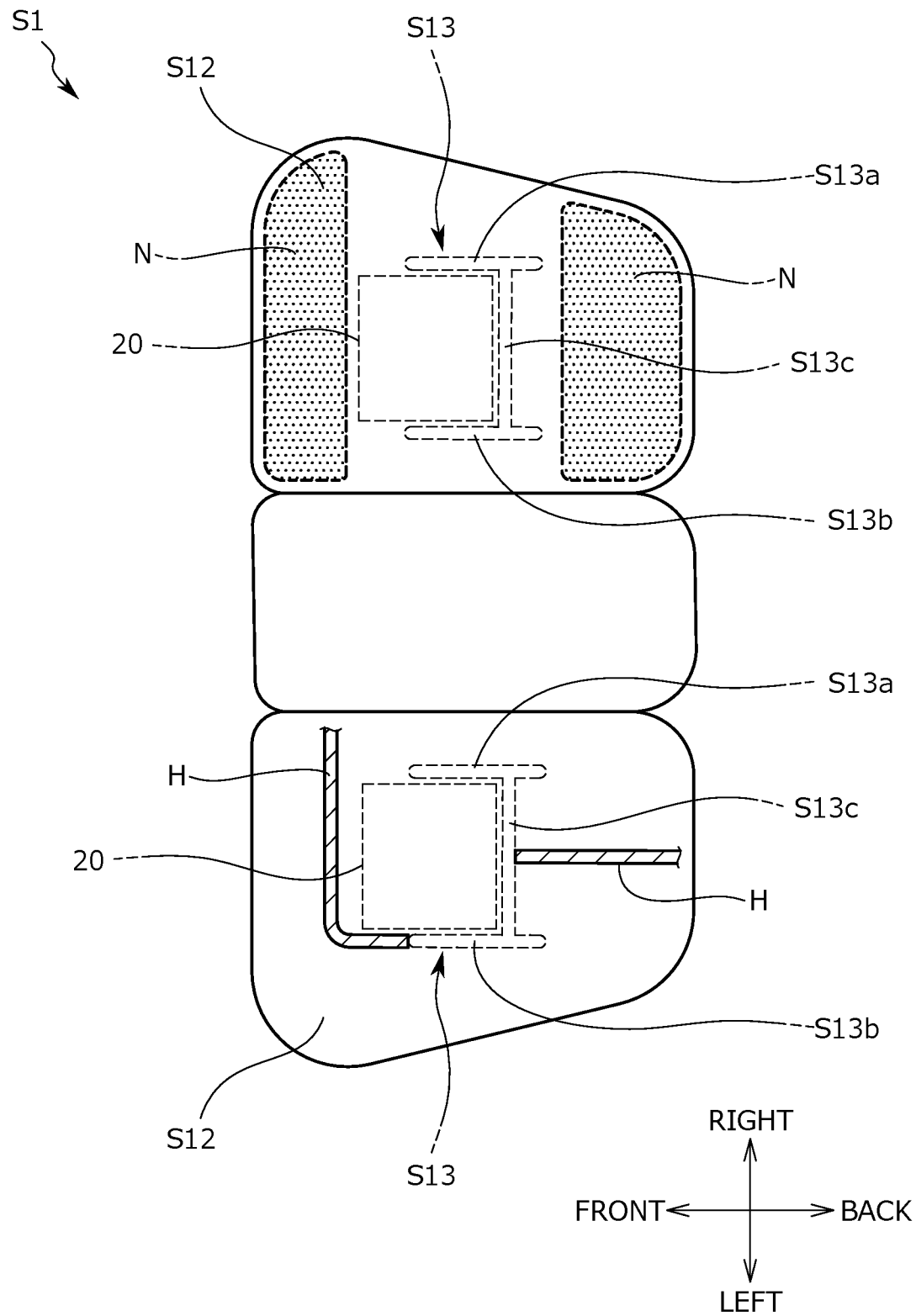
FIG. 13 is a schematic view illustrating a positional relationship between the impact absorbing member and a harness or an application region of an abnormal noise inhibitor according to the first modification example.
Figure 14:
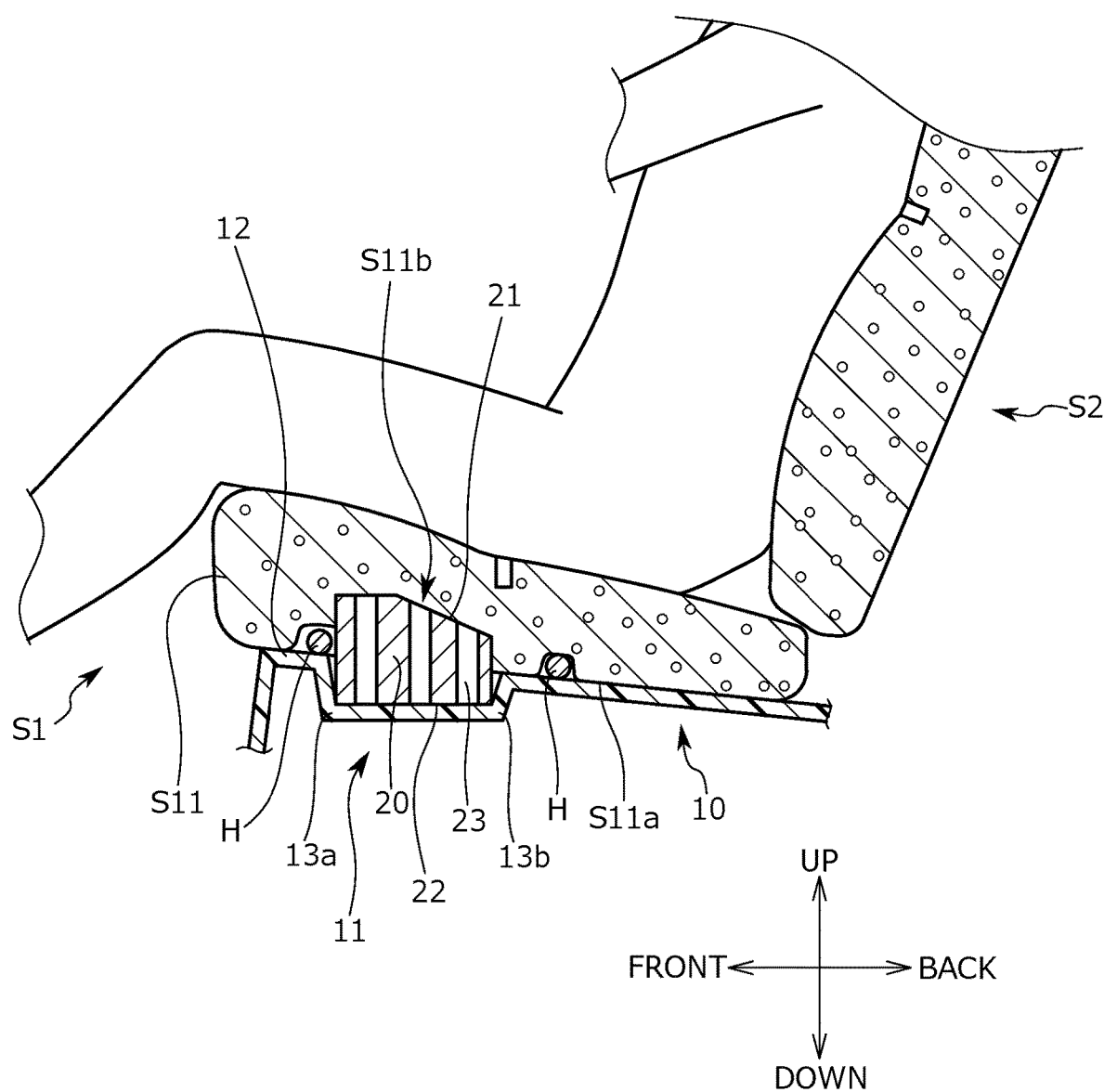
FIG. 14 is a schematic cross-sectional view illustrating the positional relationship between the impact absorbing member and the harness according to the first modification example.

In addition, as illustrated in FIGS. 13 and 14, the impact absorbing member 20 may be disposed clear of a harness H disposed in the lower surface S11a of the seat cushion pad S11. Namely, the harness H is not disposed above or below the impact absorbing member 20. Here, the harness H is to be connected to a seat heater, a sensor, etc. (not illustrated). According to such a configuration, interference of the impact absorbing member 20 with the harness H is suppressed.

In addition, as illustrated in FIG. 13, the impact absorbing member 20 may be disposed clear of an application region N of an abnormal noise inhibitor in the lower surface S11a (back surface) of the seat cushion pad S11. Here, the abnormal noise inhibitor is a material that suppresses sound to be generated when a urethane form forming the seat cushion pad S11 and a metal frame member come into contact with each other to rub against each other. According to such a configuration, an influence of the application region N of the abnormal noise inhibitor on the impact absorbing member 20 is suppressed, the abnormal noise inhibitor facilitating slippage.

5. SECOND MODIFICATION EXAMPLE

The present invention is not limited to the above embodiments. Hereinafter, a second modification example of the impact absorbing member and the seat cushion according to the present embodiment will be described with reference to FIGS. 15 and 16. In the following description, differences from the above embodiments will be mainly described.

An impact absorbing member 220 and an impact absorbing member 220X are blow molded parts made of resin, and the outer shape thereof or the number or disposition of recessed portions (cavity portions) can be appropriately set to adjust a load value when the impact absorbing members 220 and 220X are crushed to absorb an impact.

Figure 15:
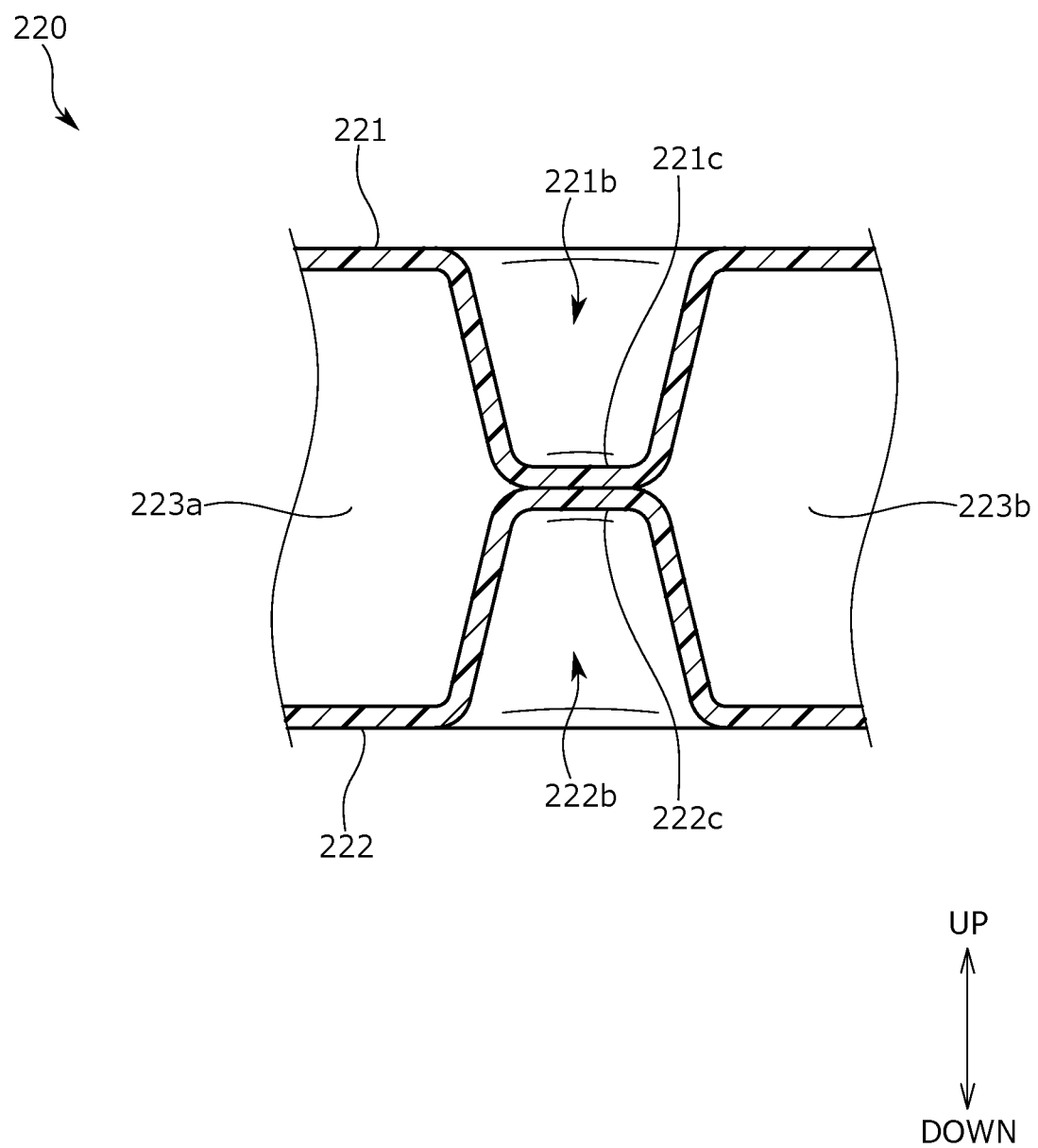
FIG. 15 is a schematic partial cross-sectional view of an impact absorbing member according to a second modification example.

As illustrated in FIG. 15, the impact absorbing member 220 includes a first recessed portion 221b provided to have an opening in an upper surface 221, and a second recessed portion 222b provided to have an opening in a lower surface 222. Here, the first recessed portion 221b and the second recessed portion 222b has a shape having rounded corners.

In addition, the first recessed portion 221b and the second recessed portion 222b are provided at positions clear of an outer wall portion of the impact absorbing member 220. In other words, the first recessed portion 221b and the second recessed portion 222b are provided at positions between a front end and a rear end of the impact absorbing member 220 and between right and left end portions (side walls) in the seat width direction.

The first recessed portion 221b is provided with a first bottom surface 221c between the upper surface 221 and the lower surface 222. The second recessed portion 222b is provided with a second bottom surface 222c between the upper surface 221 and the lower surface 222. As illustrated in FIG. 15, the first bottom surface 221c and the second bottom surface 222c are in contact with each other in the up to down direction. Since the first bottom surface 221c and the second bottom surface 222c are in contact with each other, the thickness of a bottom surface portion in the recessed portion is increased, and rigidity is improved. Hence, an impact absorption efficiency is improved.

Figure 16:
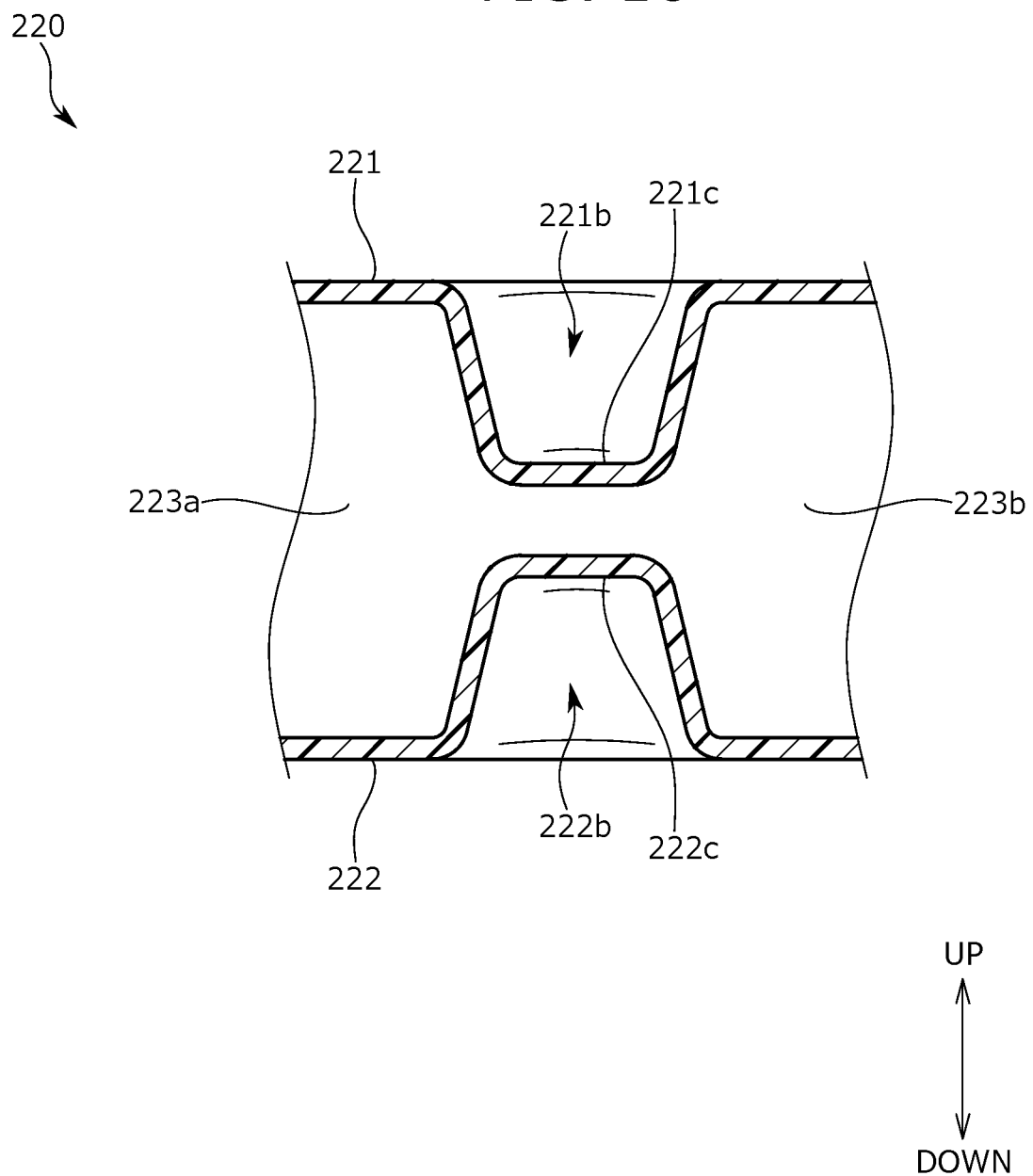
FIG. 16 is a schematic partial cross-sectional view of the impact absorbing member according to the second modification example.
Figure 17A:
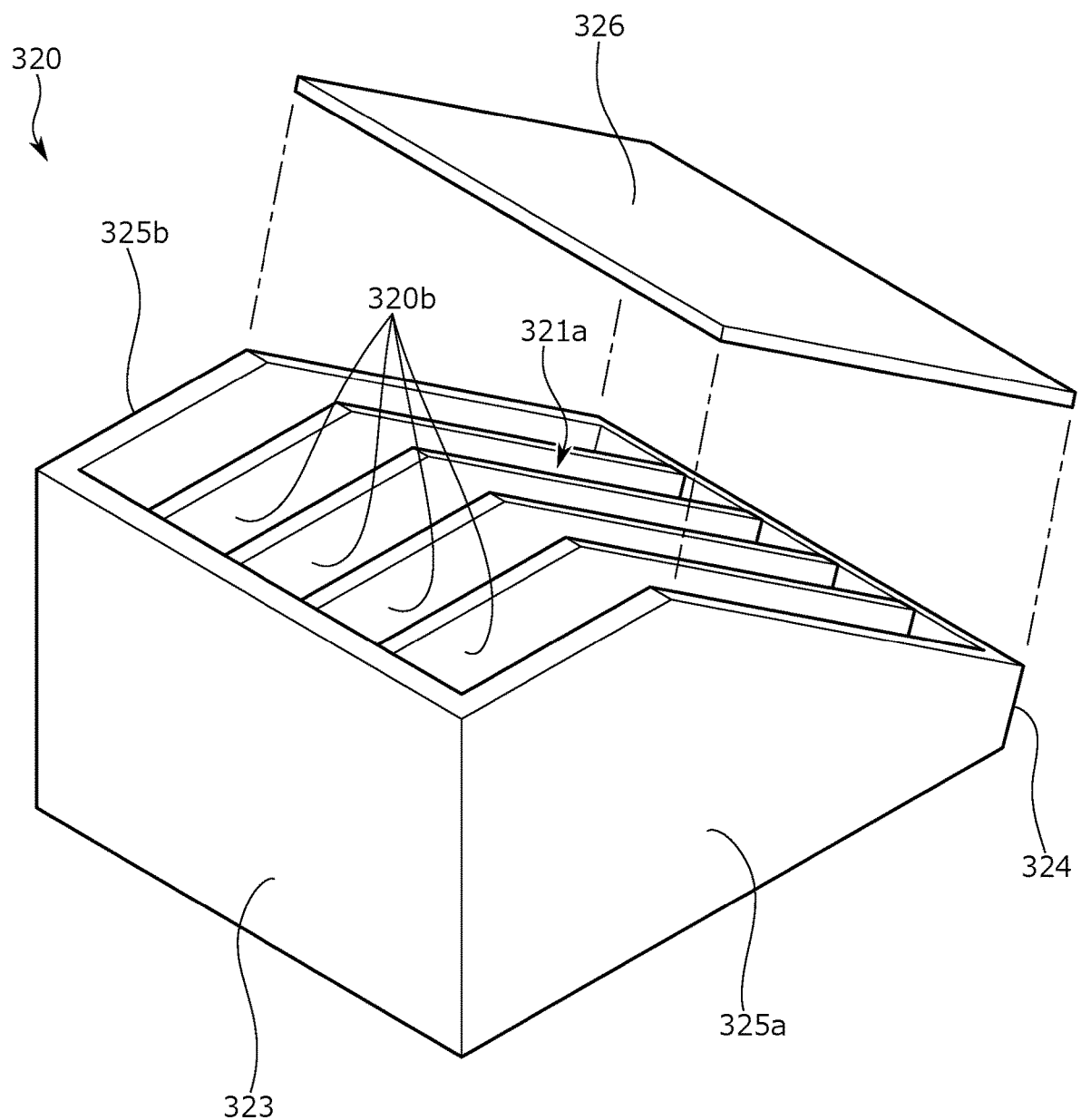
FIG. 17A is an exterior view of an impact absorbing member according to a third modification example.
Figure 17B:
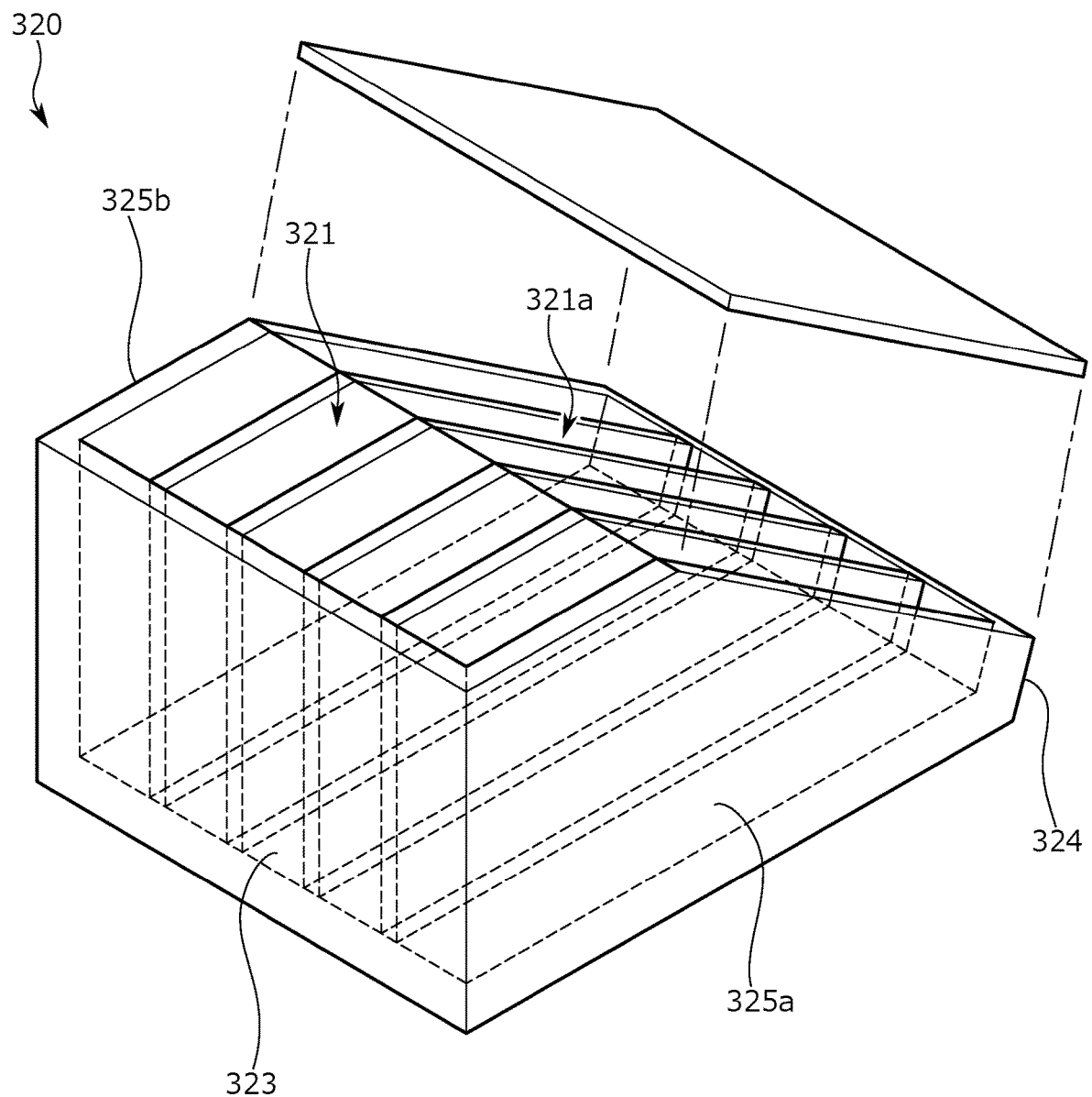
FIG. 17B is a schematic view illustrating an internal structure of the impact absorbing member according to the third modification example.
Figure 18A:
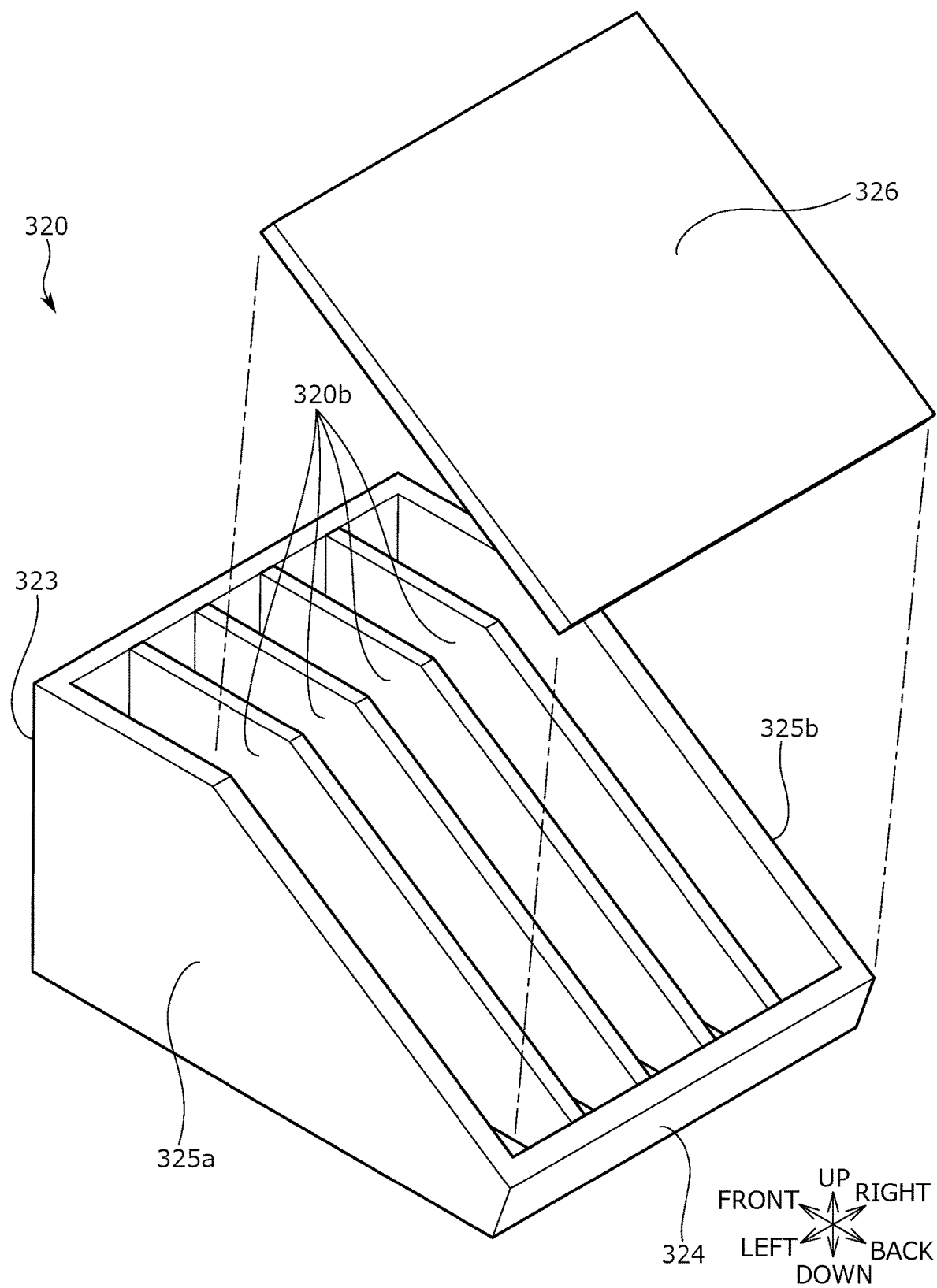
FIG. 18A is an exterior view of the impact absorbing member according to the third modification example.
Figure 18B:
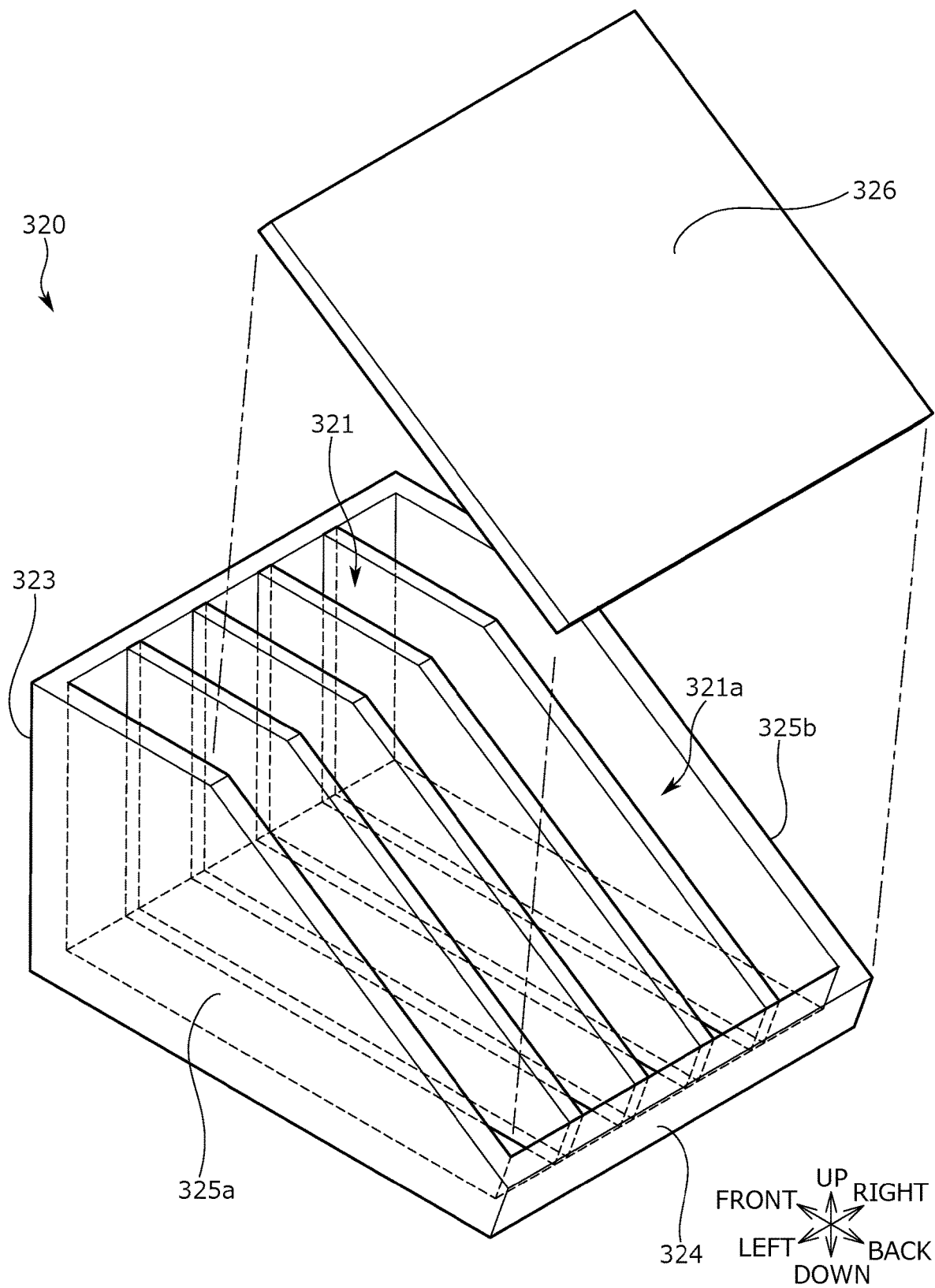
FIG. 18B is a schematic view illustrating the internal structure of the impact absorbing member according to the third modification example.

Incidentally, as illustrated in FIG. 16, the first bottom surface 221c and the second bottom surface 222c may be separated from each other in the up to down direction, and a gap 223c (space portion) may be formed between the first bottom surface 221c and the second bottom surface 222c. Since the first bottom surface 221c and the second bottom surface 222c are separated from each other in the up to down direction to form the gap 223c (space portion), the gap 223c as a space portion functions as an elastic deformable region to facilitate the adjustment of impact absorption.

As illustrated in FIGS. 15 and 16, the impact absorbing member 220 has a hollow structure. A front space 223a is formed on a front side, and a rear space 223b is formed on a rear side. In this case, when the rear space 223b is formed to have a larger volume than that of the front space 223a, impact absorbability is increased on the rear side on which an impact to be applied increases, which is preferable. Incidentally, the rear space 223b may be formed to have a smaller volume than that of the front space 223a.

Similarly to the impact absorbing member 20 in FIG. 1B, the impact absorbing member 220 is disposed between the pair of seat cushion side frames S14 in the seat width direction. Namely, the first recessed portion 221b and the second recessed portion 222b are provided in a seating portion of the occupant.

It is preferable that the impact absorbing member 220 is disposed at the same position as that of the impact absorbing member 20 in FIG. 4A, and that the first recessed portion 221b and the second recessed portion 222b are provided between a center of the seating portion and a skin pull-in portion (the first pull-in portion T1 or the second pull-in portion T2) in the seat width direction.

As described above, the second modification example of the impact absorbing member and the seat cushion according to the present embodiment includes the following technical concept.

[1] The vehicle seat S (conveyance seat) includes the seat cushion S1. The seat cushion S1 includes a seat cushion frame including the pair of seat cushion side frames S14 (side frames) provided to be separated from each other in a width direction of the vehicle seat S, the seat cushion pad S11 placed on the seat cushion frame, and the impact absorbing member 220 provided below the seat cushion pad S11. The impact absorbing member 220 is disposed between the pair of seat cushion side frames S14 (side frames) in the width direction of the vehicle seat S. The impact absorbing member 220 includes a recessed portion. The recessed portion is provided in a seating portion of an occupant.

According to such a configuration, the recessed portion of the impact absorbing member 220 is disposed between a center of the vehicle seat S (seating portion of the occupant) and the pair of side frames. Hence, an impact can be stably absorbed.

[2] In the conveyance seat described in [1], the recessed portion is the first recessed portion 221b provided to have an opening on an upper surface 221 side of the impact absorbing member 220, and the first recessed portion 221b has a shape having rounded corners.

According to such a configuration, the first recessed portion 221b has a shape having rounded corners, and is provided in the upper surface 221 of the impact absorbing member 220, so that impact absorbability is stable.

[3] In the conveyance seat described in [1] or [2], the recessed portion is the second recessed portion 222b provided to have an opening on a lower surface 222 side of the impact absorbing member 220, and the second recessed portion 222b has a shape having rounded corners.

According to such a configuration, the second recessed portion 222b has a shape having rounded corners, and is provided in the lower surface 222 of the impact absorbing member 220, so that impact absorbability is stable.

[4] In the conveyance seat described in [2], the first recessed portion 221b is provided with the first bottom surface 221c between the upper surface 221 and the lower surface 222 of the impact absorbing member 220.

According to such a configuration, the rigidity of the first recessed portion 221b is improved, so that an impact absorption efficiency is improved.

[5] In the conveyance seat described in [3], the second recessed portion 222b is provided with the second bottom surface 222c between the upper surface 221 and the lower surface 222 of the impact absorbing member 220.

According to such a configuration, the rigidity of the second recessed portion 222b is improved, so that an impact absorption efficiency is improved.

[6] In the conveyance seat described in any one of [1] to [5], the recessed portion includes the first recessed portion 221b provided to have an opening on an upper surface 221 side of the impact absorbing member 220, and the second recessed portion 222b provided to have an opening on a lower surface 222 side of the impact absorbing member 220. The first recessed portion 221b is provided with the first bottom surface 221c. The second recessed portion 222b is provided with the second bottom surface 222c. The first bottom surface 221c and the second bottom surface 222c are separated from each other in the up to down direction of the vehicle seat S, and the gap 223c (space portion) is formed between the first bottom surface 221c and the second bottom surface 222c.

According to such a configuration, the gap 223c (space portion) functions as an elastic deformable region, so that the adjustment of impact absorption is facilitated.

[7] In the conveyance seat described in any one of [1] to [5], the recessed portion includes the first recessed portion 221b provided to have an opening on an upper surface 221 side of the impact absorbing member 220, and the second recessed portion 222b provided to have an opening on a lower surface 222 side of the impact absorbing member 220. The first recessed portion 221b is provided with the first bottom surface 221c. The second recessed portion 222b is provided with the second bottom surface 222c. The first bottom surface 221c and the second bottom surface 222c are in contact with each other in the up to down direction of the vehicle seat S.

According to such a configuration, the thickness of the bottom surface portion is increased and rigidity is improved by the first bottom surface 221c and the second bottom surface 222c, so that an impact absorption efficiency is improved.

[8] In the conveyance seat described in any one of [1] to [7], a plurality of the recessed portions are provided at a center of the impact absorbing member 220.

According to such a configuration, the recessed portions are provided at the center of the impact absorbing member 220, so that an impact can be stably absorbed.

[9] In the conveyance seat described in any one of [1] to [8], the recessed portion is provided between a center of the seating portion and a skin pull-in portion in the width direction of the vehicle seat S.

According to such a configuration, the recessed portion is provided between the center of the seating portion of the occupant and the skin pull-in portion, so that an impact can be stably absorbed.

[10] In the conveyance seat described in any one of [1] to [9], the recessed portion is provided at a position clear of an outer wall portion of the impact absorbing member 220.

According to such a configuration, the shape of the recessed portion can be stably formed, so that an impact can be stably absorbed.

6. THIRD MODIFICATION EXAMPLE

The present invention is not limited to the above embodiments. Hereinafter, a third modification example of the impact absorbing member and the seat cushion according to the present embodiment will be described with reference to FIGS. 17A to 18B. In the following description, differences from the above embodiments will be mainly described.

As illustrated in FIGS. 17A to 18B, an impact absorbing member 320 is formed in a box shape including an internal space 320a. A plurality of rib members 320b having a plate shape are disposed side by side in the seat width direction in the internal space 320a. In other words, the plurality of rib members 320b having a plate shape and extending in the front to back direction and the up to down direction are disposed in the internal space 320a.

In addition, the impact absorbing member 320 is configured to have an upper surface 321 and a lower surface 322 in the up to down direction, a front surface 323 and a rear surface 324 in the front to back direction, and a first side surface 325a and a second side surface 325b in the seat width direction.

The upper surface 321 of the impact absorbing member 320 is mainly formed of the rib members 320b. The upper surface 321 has an inclined surface 321a that is inclined downward as extending backward.

Then, a plate-shaped member 326 is disposed to cover the inclined surface 321a.

The plate-shaped member 326 is insert-molded in the lower surface S11a corresponding to the back surface of the seat cushion pad S11 made of urethane at a position facing the inclined surface 321a of the impact absorbing member 320. The plate-shaped member 326 is made of a resin material (polypropylene, high-hardness urethane, etc.) or a metal material (iron, steel, etc.).

Similarly to the impact absorbing member 20 in FIG. 1B, the impact absorbing member 320 is disposed between the pair of seat cushion side frames S14 in the seat width direction. Namely, each of the rib members 320b is provided in the seating portion of the occupant.

In the impact absorbing member 320, the rib members 320b are disposed in the internal space 320a so as to be crushed to absorb an impact when a certain load value is exceeded during input of a load from the occupant. In the impact absorbing member 320, an impact is to be absorbed mainly by the rib members 320b. An impact absorption load in the impact absorbing member 320 can be adjusted by changing the thickness of the rib members 320b, connecting the rib members 320b to each other in the seat width direction, providing a fragile portion in the rib members 320b, etc.

7. IMPACT ABSORBING DEVICE ACCORDING TO ANOTHER EMBODIMENT

A configuration of an impact absorbing device 50 according to another embodiment provided in the vehicle seat S (FIGS. 1A and 1B) of the present invention will be described with reference to FIGS. 19 to 21.

Figure 19:
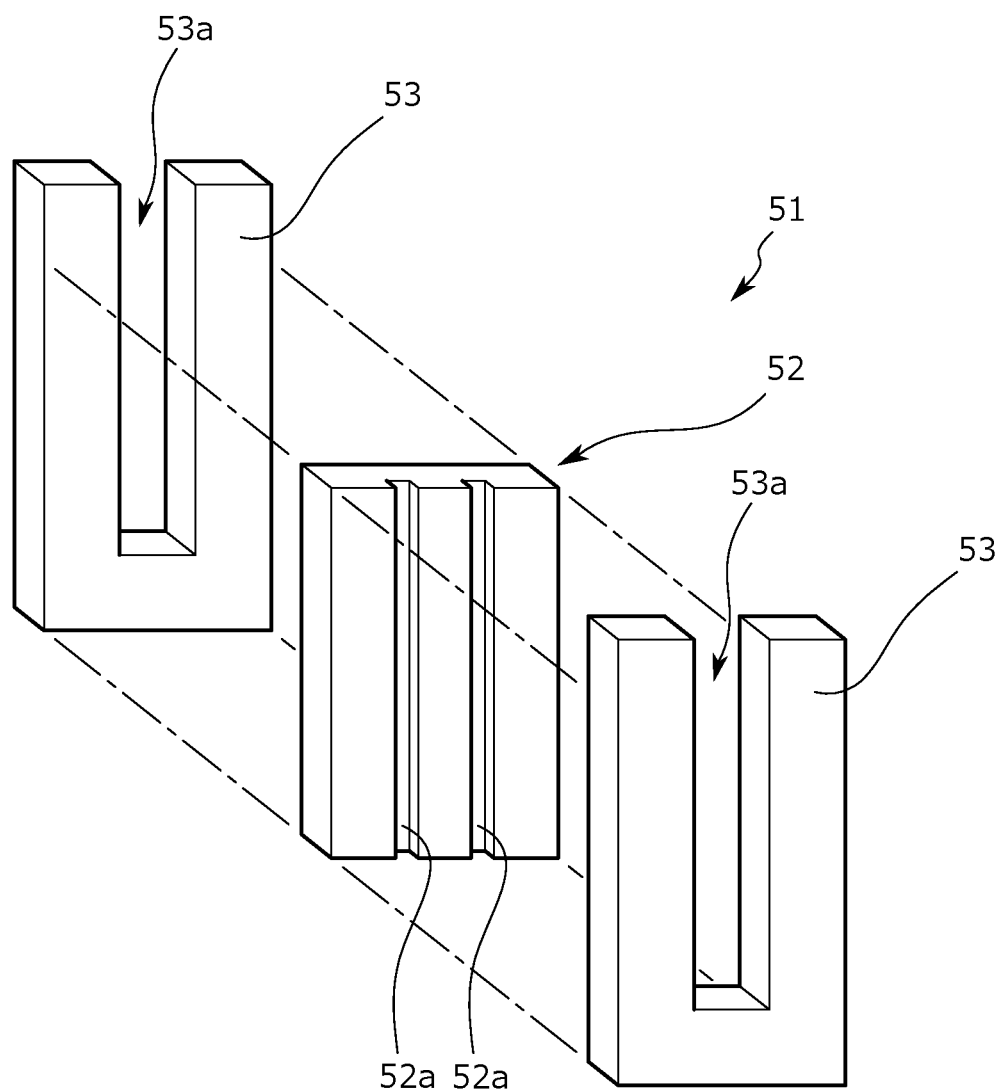
FIG. 19 is an exploded view illustrating a configuration of an impact absorbing portion according to another embodiment of the present invention.
Figure 19:
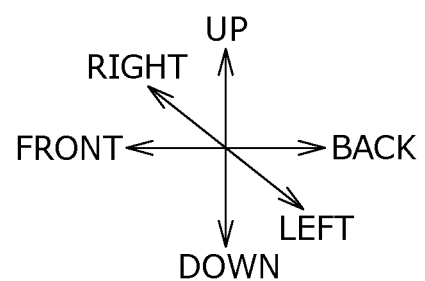

FIG. 19 is an exploded view illustrating a configuration of an impact absorbing portion 51. The impact absorbing portion 51 is configured such that an energy absorbing plate 52 configured to be deformed to absorb an impact when a certain load value is exceeded is interposed between a pair of guide members 53. Two grooves are formed in a side surface of the energy absorbing plate 52, and the energy absorbing plate 52 is to be deformed easily when a load is applied thereto. In addition, a cutout 53a that accommodates a protrusion shaft 54a of an impact absorbing member 54 to be described later is formed in each of the guide members 53.

Figure 20:
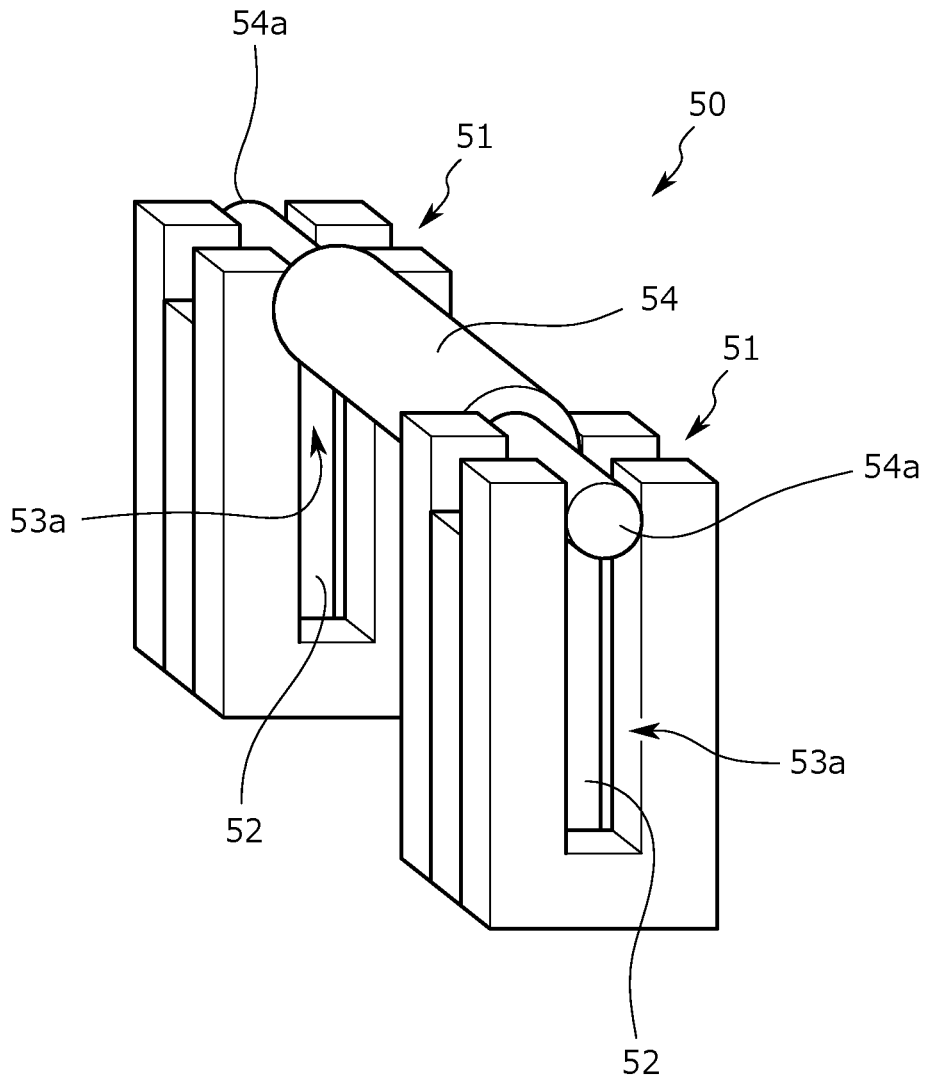
FIG. 20 is a schematic view illustrating a configuration of an impact absorbing device according to another embodiment of the present invention.
Figure 20:
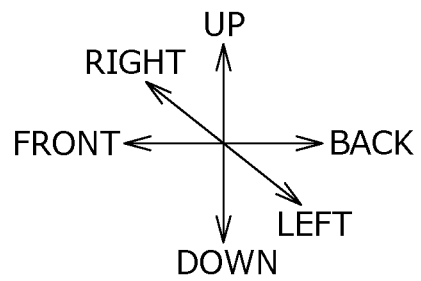

FIG. 20 is a schematic view illustrating the configuration of the impact absorbing device 50. The impact absorbing device 50 includes a pair of the impact absorbing portions 51 disposed to be separated from each other in the seat width direction, and the impact absorbing member 54 to which a load from the occupant is to be applied. The impact absorbing member 54 extends in the seat width direction, and includes the protrusion shafts 54a in both end portions thereof, the protrusion shafts 54a protruding outward.

The protrusion shaft 54a is accommodated in the cutouts 53a provided in the pair of guide members 53 of the impact absorbing portion 51, and is placed on an upper surface of the energy absorbing plate 52 (energy absorbing member) from above. When a load from above is applied from a state illustrated in FIG. 20, the impact absorbing member 54 moves downward, and the protrusion shaft 54*a* deforms (breaks off) the energy absorbing plate 52. At this time, an impact is to be absorbed with the deformation of the energy absorbing plate 52.

Figure 21:
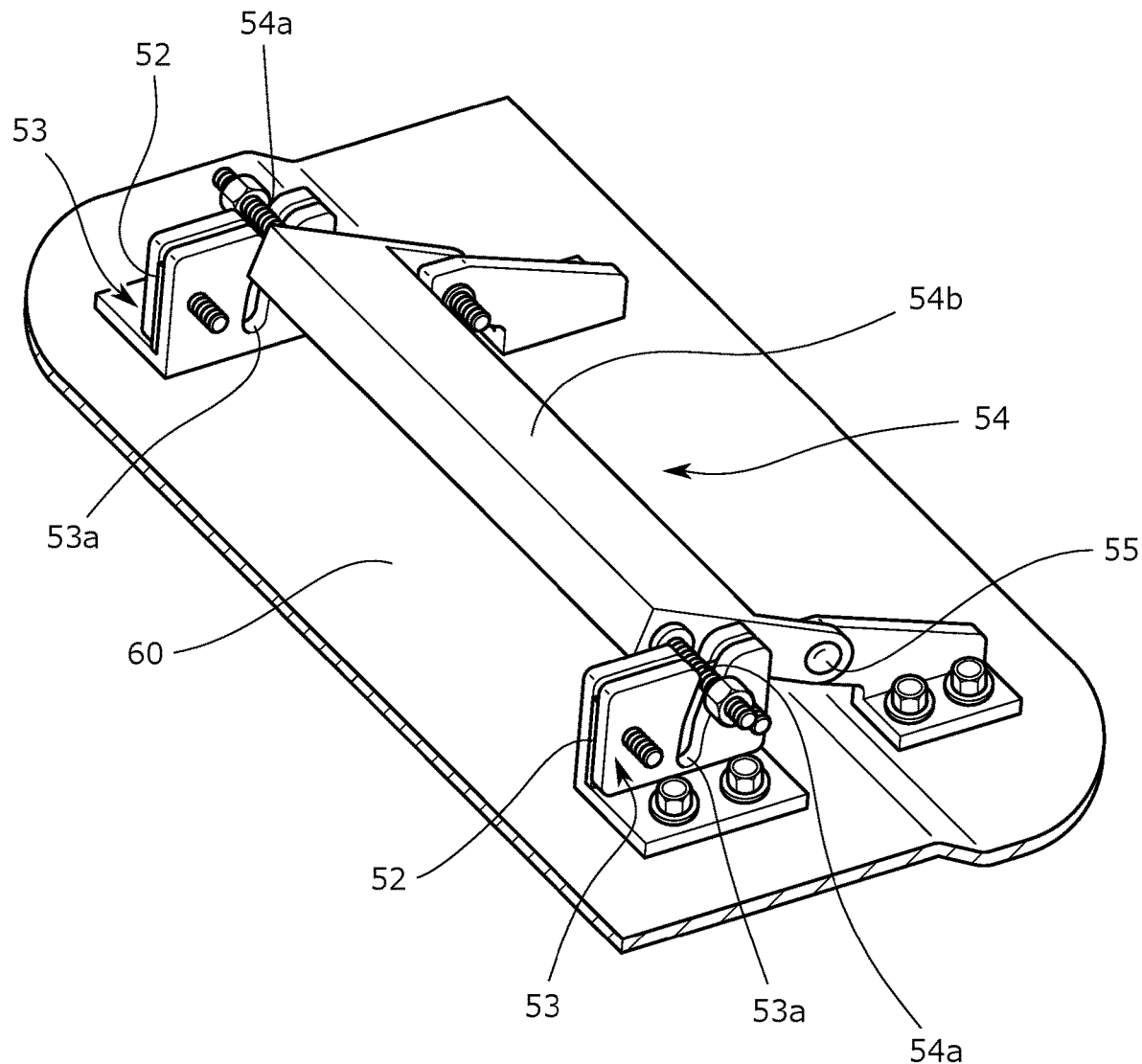
FIG. 21 is a schematic view illustrating a state where the impact absorbing device according to another embodiment of the present invention is applied to a vehicle seat.
Figure 21:
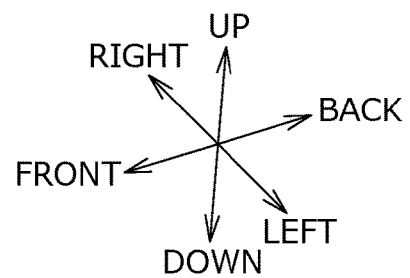

FIG. 21 is a schematic view illustrating a state where the impact absorbing device 50 is applied to the vehicle seat S illustrated in FIGS. 1A and 1B. As illustrated in FIG. 21, the impact absorbing device 50 is attached to an upper surface of a plate-shaped member 60 (support member) provided below the seat cushion pad S11 of the seat cushion S1. As examples of the plate-shaped member 60, although not particularly limited, a plate-shaped member forming the floor that supports the vehicle rear seat from below, a pan frame provided in a seat cushion frame, etc. are provided. Incidentally, the impact absorbing device 50 is disposed inward from a pair of seat cushion side frames (not illustrated) provided to be separated from each other in the seat width direction.

The impact absorbing member 54 includes a load-receiving surface 54*b* that receives a load from the occupant, and is configured to be rotatable downward around a rotation axis 55. The impact absorbing portion 51 is a mechanism in which the protrusion shaft 54*a* slides downward, and easily adjusts a load value when an impact is absorbed.

The impact absorbing device 50 has a structure in which a load from the occupant is to be received by the load-receiving surface 54*b* (flat surface). The impact absorbing portions 51 are disposed at two locations in both end portions in the seat width direction to interpose the load-receiving surface 54*b* therebetween, and an impact is to be stably absorbed.

The rotation axis 55 of the impact absorbing member 54 is set as a rotation axis separate from a reclining rotation axis provided in the vehicle seat S. According to the impact absorbing device 50, an impact can be effectively absorbed, so that space saving is realized. In addition, since the mechanism is such that the protrusion shaft 54*a* of the impact absorbing member 54 slides downward, operation stability during impact absorption is good. Further, since the impact absorbing device 50 is attached to the upper surface of the plate-shaped member 60 provided below the seat cushion pad S11 of the seat cushion S1, assemblability or maintainability is good.

The vehicle seat S including the impact absorbing device 50 according to another embodiment is the vehicle seat S (conveyance seat) including the seat cushion S1. The seat cushion S1 includes the seat cushion frame (seat cushion side frames S14), the seat cushion pad S11 placed on the seat cushion frame, and the impact absorbing device 50 provided below the seat cushion pad S11. The impact absorbing device 50 includes the impact absorbing member 54 extending in the width direction of the conveyance seat S, and the energy absorbing member (energy absorbing plate 52) that absorbs a load to be applied to the impact absorbing member 54 from above. The impact absorbing device 50 is supported from below by the support member (plate-shaped member 60).

The conveyance seat according to the present embodiment has been described above as an example of the vehicle seat. The seat cushion according to the present embodiment is not particularly limited in terms of application as long as the seat cushion is applicable to a seat in which an impact on a seated occupant can be generated, particularly, to a seat in which sinking of the waist of a seated occupant can occur when an impact is generated. For example, the seat cushion of the present invention can also be used as a seat cushion of a conveyance seat to be used in conveyances other than vehicles.

| REFERENCE SIGNS LIST | |
|---|---|
| S: | vehicle seat (conveyance seat) |
| S1: | seat cushion |
| S11: | seat cushion pad |
| S11a: | lower surface |
| S11b: | pad recessed portion |
| S12: | trim cover |
| T1: | first pull-in portion (right pull-in portion) |
| T2: | second pull-in portion (left pull-in portion) |
| T3: | third pull-in portion (rear pull-in portion) |
| S13: | sensor member |
| S13a: | first sensor portion (right sensor portion) |
| S13b: | second sensor portion (left sensor portion) |
| S13c: | third sensor portion (rear sensor portion) |
| S14: | seat cushion side frame (side frame, seat cushion frame) |
| S2: | seat back |
| S3: | headrest |
| 10: | plate-shaped member (support member) |
| 11: | recessed portion |
| 12: | protrusion portion (sinking suppression member) |
| 13a: | front bent portion (bent portion) |
| 13b: | front bent portion (bent portion) |
| 20, 20X, 20A, 20B, 20C: | impact absorbing member |
| 21, 21X, 21A, 21B, 21C: | upper surface |
| 21a: | inclined surface |
| 22, 22X, 22A, 22B, 22C: | lower surface |
| 23, 23X, 23A, 23B, 23C: | cavity portion |
| S1X: | seat cushion |
| S11X: | seat cushion pad |
| S11Xa: | lower surface |
| S11Xb: | pad recessed portion |
| S12X: | trim cover |
| S14X: | seat cushion frame (support member) |
| S14Xa: | recessed portion |
| S14Xb: | bottom surface |
| S14Xc: | seat cushion side frame |
| 10Y: | support member |
| WF: | wire frame |
| B: | blower |
| H: | harness |
| N: | application region of abnormal noise inhibitor |
| 220: | impact absorbing member |
| 221: | upper surface |
| 221b: | first recessed portion |
| 221c: | first bottom surface |
| 222: | lower surface |
| 222b: | second recessed portion |
| 222c: | second bottom surface |
| 223a: | front space |
| 223b: | rear space |
| 223c: | gap (space portion) |
| 320: | impact absorbing member |
| 320a: | internal space |
| 320b: | rib member |
| 321: | upper surface |
| 321a: | inclined surface |
| 322: | lower surface |
| 323: | front surface |
| 324: | rear surface |
| 325a: | first side surface |
| 325b: | second side surface |
| 326: | plate-shaped member |
| 50: | impact absorbing device |
| 51: | impact absorbing portion |
| 52: | energy absorbing plate |
| 52a: | groove |
| 53: | guide member |
| 53a: | cutout |
| 54: | impact absorbing member |

-continued

REFERENCE SIGNS LIST

| | |
|---|---|
| 54a: | protrusion shaft |
| 54b: | load-receiving surface |
| 55: | rotation axis |
| 60: | plate-shaped member |

The invention claimed is:

1. A conveyance seat, comprising:
a seat cushion,
wherein the seat cushion includes:
- a seat cushion frame including a pair of side frames provided to be separated from each other in a width direction of the conveyance seat;
- a seat cushion pad placed on the seat cushion frame;
- an impact absorbing member provided below the seat cushion pad; and
- a support member that supports the impact absorbing member from below, the impact absorbing member is disposed between the pair of side frames in the width direction of the conveyance seat,
the impact absorbing member is provided with a cavity portion,
the support member is provided with a recessed portion at a rear of a front end portion of the support member, the recessed portion being recessed downward and lower than the front end portion of the support member, and
at least a part of a lower surface of the impact absorbing member is accommodated in the recessed portion of the support member.

2. The conveyance seat according to claim 1,
wherein the lower surface of the impact absorbing member is disposed at a position clear of a bent portion of the support member.

3. The conveyance seat according to claim 1,
wherein a pad recessed portion that is recessed upward is formed in a lower surface of the seat cushion pad,
at least a part of an upper surface of the impact absorbing member is accommodated in the pad recessed portion of the seat cushion pad, and
the recessed portion of the support member and the pad recessed portion are located in opposite positions facing each other in an up to down direction of the conveyance seat.

4. The conveyance seat according to claim 1,
wherein the impact absorbing member is disposed behind a sinking suppression member extending in the width direction of the conveyance seat.

5. The conveyance seat according to claim 1,
wherein a plate-shaped member is provided at a position facing an upper surface of the impact absorbing member.

6. The conveyance seat according to claim 1,
wherein a metal member is not disposed between an upper surface of the impact absorbing member and the seat cushion pad.

7. The conveyance seat according to claim 1,
wherein the seat cushion pad is covered with a skin material, and
the cavity portion of the impact absorbing member is disposed at a position clear of a pull-in portion of the skin material.

8. The conveyance seat according to claim 1,
wherein the seat cushion includes a sensor member, and
the cavity portion of the impact absorbing member is disposed at a position clear of the sensor member.

9. The conveyance seat according to claim 1,
wherein the cavity portion of the impact absorbing member is formed as a second recessed portion, and
the second recessed portion is provided to extend in a vertical direction.

10. The conveyance seat according to claim 1,
wherein the cavity portion of the impact absorbing member is formed as a second recessed portion, and
the second recessed portion has an opening in the lower surface of the impact absorbing member.

11. The conveyance seat according to claim 1,
wherein the cavity portion of the impact absorbing member is formed as a second recessed portion,
a part of an upper surface of the impact absorbing member is accommodated in a pad recessed portion of the seat cushion pad, and
at least a part of the cavity portion of the impact absorbing member is disposed at the same height position in an up to down direction of the conveyance seat as a position of the pad recessed portion.

12. The conveyance seat according to claim 1,
wherein the seat cushion frame is made of a resin material, and
the impact absorbing member is surrounded by the seat cushion frame in a front to back direction of the conveyance seat and in the width direction of the conveyance seat.

13. The conveyance seat according to claim 1,
wherein the cavity portion of the impact absorbing member is a through-hole having a circular cylindrical shape.

14. The conveyance seat according to claim 1,
wherein an inclined surface that is inclined downward as extending backward is formed in an upper surface of the impact absorbing member.

* * * * *